United States Patent
Khirallah et al.

(10) Patent No.: US 12,127,256 B2
(45) Date of Patent: Oct. 22, 2024

(54) COMMUNICATION SYSTEM

(71) Applicant: NEC Corporation, Tokyo (JP)

(72) Inventors: Chadi Khirallah, Surrey (GB); Sadafuku Hayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/626,572

(22) PCT Filed: Jul. 30, 2021

(86) PCT No.: PCT/JP2021/028449
§ 371 (c)(1),
(2) Date: Jan. 12, 2022

(87) PCT Pub. No.: WO2022/030406
PCT Pub. Date: Feb. 10, 2022

(65) Prior Publication Data
US 2023/0345532 A1    Oct. 26, 2023

(30) Foreign Application Priority Data
Aug. 6, 2020  (GB) ..................................... 2012285

(51) Int. Cl.
*H04W 74/0816*   (2024.01)
*H04W 76/30*   (2018.01)

(52) U.S. Cl.
CPC ....... *H04W 74/0816* (2013.01); *H04W 76/30* (2018.02)

(58) Field of Classification Search
None
See application file for complete search history.

(56) References Cited

U.S. PATENT DOCUMENTS

| | | | |
|---|---|---|---|
| 2018/0317218 A1 | 11/2018 | Li et al. | |
| 2018/0368205 A1* | 12/2018 | Park | H04W 76/30 |
| 2019/0215756 A1 | 7/2019 | Park et al. | |
| 2019/0313244 A1 | 10/2019 | Wang et al. | |
| 2019/0342800 A1 | 11/2019 | Sirotkin et al. | |
| 2020/0221495 A1 | 7/2020 | Chen et al. | |

(Continued)

FOREIGN PATENT DOCUMENTS

| | | |
|---|---|---|
| EP | 3512247 A1 | 7/2019 |
| JP | 2015-216412 A | 12/2015 |
| JP | 2019-503142 A | 1/2019 |

OTHER PUBLICATIONS

Japanese Office Action for JP Application No. 2022-505328, mailed on Jan. 17, 2023 with English Translation.

(Continued)

*Primary Examiner* — Jutai Kao

(57) ABSTRACT

A communication system is disclosed in which a base station performs Listen-Before-Talk (LBT) communication with an item of user equipment (UE) via at least one cell. When the base station of the UE detects a failure associated with the LBT communication in at least one cell, the base station transmits a signalling message to another node (e.g., a central unit, a master node, a secondary node, or a core network node), the signalling message comprising information indicating that LBT failure has been detected. The information is used by the other node in managing the LBT communication with the UE (e.g., releasing resources, deactivating cells, etc.).

10 Claims, 17 Drawing Sheets

(56) References Cited

U.S. PATENT DOCUMENTS

| | | | |
|---|---|---|---|
| 2020/0228278 A1* | 7/2020 | Park | H04W 76/30 |
| 2022/0174512 A1* | 6/2022 | Rune | H04W 24/10 |
| 2023/0077269 A1* | 3/2023 | Liu | H04W 74/0833 |
| 2023/0180274 A1 | 6/2023 | Li et al. | |

OTHER PUBLICATIONS

Ericsson, "[Post109bis-e][961][MDTSON] SON open issues", 3GPP TSG RAN WG2 #110-e R2-2004724, Jun. 2020.

International Search Report for PCT Application No. PCT/JP2021/028449, mailed on Sep. 22, 2021.

English translation of Written opinion for PCT Application No. PCT/JP2021/028449, mailed on Sep. 22, 2021.

GB Office Action for GB Application No. GB2012285.9, mailed on May 11, 2021.

Qualcomm (Rapporteur), "CR to 38.300 on Integrated Access and Backhaul for NR", 3GPP TSG-RAN WG2 Meeting #110e, E-meeting, Jun. 1-12, 2020, R2-2006303, pp. 1-22.

NGMN, "NGMN 5G White Paper", V1.0, Feb. 17, 2015, pp. 1-125.

3GPP TS 37.213 V16.2.0, "Physical layer procedures for shared spectrum channel access", Jun. 2020, pp. 1-26.

3GPP TS 38.300 V16.2.0, "NR; NR and NG-RAN Overall Description", Jul. 2020, pp. 1-148.

3GPP TS 38.321 V16.1.0, "Medium Access Control (MAC) protocol specification", Jul. 2020, pp. 1-151.

Rapporteur (CMCC, Ericsson), "Revised WID on enhancement of data collection for SON/MDT in NR and ENDC", 3GPP TSG RAN meeting #88-e, Online, Jun. 26-Jul. 3, 2020, RP-201281, pp. 1-6.

3GPP TS 38.425, V16.1.0 (section 5.5.3.23 and section 5.5.3.38), "NR user plane protocol", Jul. 2020, pp. 1-25.

3GPP TS 22.368 V13.1.0, "Service requirements for Machine-Type Communications", Dec. 2014, pp. 1-26.

JP Office Action for JP Application No. 2023-125936, mailed on Sep. 10, 2024 with English Translation.

\* cited by examiner

COMMUNICATION SYSTEM

This application is a National Stage Entry of PCT/JP2021/028449 filed on Jul. 30, 2021, which claims priority from Great Britain Patent Application 2012285.9 filed on Aug. 6, 2020, the contents of all of which are incorporated herein by reference, in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular, although not necessarily exclusive relevance to reporting and handling failures related to spectrum sharing in the so-called '5G' (or 'Next Generation') systems.

BACKGROUND ART

The latest developments of the 3GPP standards are referred to as '5G' or 'new radio' (NR). These terms refer to an evolving communication technology that supports a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network (NGC).

Under the 3GPP standards, the base station (e.g., an 'eNB' in 4G or a 'gNB' in 5G) is a node via which communication devices (user equipment or 'UE') connect to a core network and communicate to other communication devices or remote servers. For simplicity, the present application will use the term base station to refer to any such base stations.

In the 5G architecture, the gNB internal structure may be split into two parts known as the Central Unit (CU) and the Distributed Unit (DU), connected by an F1 interface. This enables the use of a 'split' architecture, whereby the, typically 'higher', CU layers (for example, but not necessarily or exclusively), PDCP) and the, typically 'lower', DU layers (for example, but not necessarily or exclusively, RLC/MAC/PHY) to be implemented separately. Thus, for example, the higher layer CU functionality for a number of gNBs may be implemented centrally (for example, by a single processing unit, or in a cloud-based or virtualised system), whilst retaining the lower layer DU functionality locally, in each of the gNB.

For simplicity, the present application will use the term mobile device, user device, or UE to refer to any communication device that is able to connect to the core network via one or more base stations.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called Internet of Things' (IoT) devices (e.g., Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems, and the like. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

For simplicity, the present application often refers to mobile devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

5G may be implemented using spectrum allocated to 4G communications (e.g., Long Term Evolution (LTE) or LTE-Advanced) or unlicensed/unallocated spectrum (e.g., 5 GHz and 6 GHz unlicensed bands, all the way up to 60 GHz, also known as mmWave). This scenario is referred to as spectrum sharing and it allows network operators to roll out 5G access technology relatively quickly and cost efficiently. In order to ensure that disturbance/interference caused by 5G communications to other communications in the 4G or unlicensed spectrum is kept to a minimum, 5G employs a so-called Listen-Before-Talk (LBT) approach. LBT is a mechanism by which a communication device applies clear channel assessment (CCA) before using the shared spectrum (or channel). When LBT is applied, a transmitter listens to/senses the channel to determine whether the channel is free or busy and performs transmission only if the channel is sensed free. Effectively, a transmitter needs to determine ('listen') whether the channel in the shared spectrum is used by another transmitter (e.g., UE or base station) before it is allowed to transmit ('talk') using that channel. Specifically, CCA employs Energy Detection (ED) in order to determine whether the channel is clear or not.

NR Radio Access operating with shared spectrum channel access can operate in different modes where either PCell, PSCell, or SCells can be in shared spectrum (and it may be configured for downlink only, in case of an SCell). The gNB operates in either dynamic or semi-static channel access mode as described in 3GPP TS 37.213 V16.2.0. In both channel access modes, the gNB and UE may apply LBT before performing a transmission on a cell configured with shared spectrum channel access. 3GPP TS 38.300 V16.2.0 provides further details of the procedures for accessing shared spectrum.

When the UE detects consistent uplink LBT failures, it takes actions as specified in 3GPP TS 38.321 V16.1.0. When consistent uplink LBT failures are detected on SCell(s), the UE reports the failures to the corresponding gNB (the Master Node (MN) for its Master Cell Group (MCG)/Secondary Node (SN) for its Secondary Cell Group (SCG)) on a different serving cell than the SCell(s) where the failures were detected.

3GPP TS 38.300 also describes what is meant by Radio Link Failure (RLF) and provides an overview of the related procedures. One of the criteria defined for declaring RLF is detection of consistent uplink LBT failures for operation with shared spectrum channel access.

In addition, a recent 3GPP work item (RP-201281) is concerned with enhancement of data collection for Self- Organizing Networks (SON)/Minimization of drive tests (MDT) in New Radio and in E-UTRAN New Radio-Dual Connectivity (EN-DC). The objective of this work item is to specify data collection enhancement in NR for SON/MDT purpose. The specific objectives include support of data collection for SON features, including specification of inter-node information exchange and possible enhancements to S1/NG, X2/Xn, and F1/E1 interfaces. Another objective is to support data collection for MDT features certain use cases, including enhancement of RLF reporting and accessibility measurements. The work item also mentions the need for NR-U related SON/MDT optimization aiming to reuse the existing NR-U measurements.

Thus, whilst there is some ongoing work in 3GPP relating to development of LBT features (and related functionality such as detection of RLF), there are a number of issues that have not been addressed yet. Specifically, the inventors have identified some problems with the currently proposed mechanisms relating to LBT failures. For example, the existing technical specifications and work items do not provide an appropriate way to report LBT Failures for NR-U SON/MDT optimization purpose. It is also not clear what sort of NR-U measurements are to be collected for SON/MDT optimization purposes.

SUMMARY OF INVENTION

Accordingly, preferred example embodiments of the present invention aim to provide methods and apparatus which address or at least partially deal with one or more of the above issues.

Although for efficiency of understanding for those of skill in the art, the invention will be described in detail in the context of a 3GPP system (NR), the principles of the invention can be applied to other systems in which communication devices or User Equipment (UE) employ spectrum sharing.

In one example aspect, the invention provides a method performed by a distributed unit of a base station apparatus performing Listen-Before-Talk (LBT) communication with a user equipment (UE) via at least one cell, the method comprising: detecting a failure associated with said LBT communication with respect to said at least one cell; and transmitting a signalling message to a central unit of said base station apparatus, the signalling message comprising information indicating that LBT failure has been detected, for use by said central unit in managing said LBT communication with the UE.

In one example aspect, the invention provides a method performed by a base station apparatus configured to act as a corresponding node for a Packet Data Convergence Protocol (PDCP) entity for a user equipment (UE) performing Listen-Before-Talk (LBT) communication via at least one cell, the method comprising: detecting a failure associated with said LBT communication with respect to said at least one cell; and transmitting a signalling message to the PDCP entity, the signalling message comprising information indicating that LBT failure has been detected, for use by the PDCP entity in managing said LBT communication with the UE.

In one example aspect, the invention provides a method performed by a central unit of a base station apparatus performing Listen-Before-Talk (LBT) communication with a user equipment (UE) via at least one cell, the method comprising: receiving, from a distributed unit operating said at least one cell, a signalling message comprising information indicating that LBT failure has been detected; and managing said LBT communication with the UE based on the received information.

In one example aspect, the invention provides a method performed by a base station apparatus performing Listen-Before-Talk (LBT) communication with a user equipment (UE) via at least one cell of a Secondary Cell Group (SCG), the method comprising: detecting a failure associated with said LBT communication with respect to said at least one SCG cell; and transmitting a signalling message to a Master Node, the signalling message comprising information indicating that LBT failure has been detected, initiating a procedure for deactivating the at least one SCG cell for which said LBT failure has been detected.

In one example aspect, the invention provides a method performed by a base station apparatus performing Listen-Before-Talk (LBT) communication with a user equipment (UE) via at least one cell, the method comprising: detecting a failure associated with said LBT communication with respect to said at least one cell; and initiating a procedure for releasing a context associated with the UE in a core network by transmitting a UE Context Release Request message to a node of the core network, including information indicating that LBT failure has been detected.

In one example aspect, the invention provides a method performed by a user equipment (UE) performing Listen-Before-Talk (LBT) communication via at least one cell, the method comprising: detecting a failure associated with said LBT communication with respect to said at least one cell; and transmitting, to a base station apparatus, information indicating that LBT failure has been detected, for use by said base station apparatus in managing said LBT communication.

In one example aspect, the invention provides a method performed by a node of an access network communicating with a user equipment (UE) performing Listen-Before-Talk (LBT) communication via at least one cell, the method comprising: receiving, from the UE, information indicating that LBT failure has been detected by the UE; and managing said LBT communication with the UE based on the received information.

In one example aspect, the invention provides a method performed by a base station apparatus configured as a Packet Data Convergence Protocol (PDCP) entity for a user equipment (UE) performing Listen-Before-Talk (LBT) communication via at least one cell, the method comprising: receiving, from a base station apparatus configured to act as a corresponding node, information indicating that LBT failure has been detected with respect to said at least one cell; and performing a Self-Organizing Network (SON) procedure based on the received information.

In one example aspect, the invention provides an apparatus configured to operate as a distributed unit of a base station for performing Listen-Before-Talk (LBT) communication with a user equipment (UE) via at least one cell, the apparatus comprising: means for detecting a failure associated with said LBT communication with respect to said at least one cell; and means for transmitting a signalling message to a central unit of said base station apparatus, the signalling message comprising information indicating that LBT failure has been detected, for use by said central unit in managing said LBT communication with the UE.

In one example aspect, the invention provides a base station apparatus configured to act as a corresponding node for a Packet Data Convergence Protocol (PDCP) entity for a user equipment (UE) and to perform Listen-Before-Talk (LBT) communication via at least one cell, the base station apparatus comprising: means for detecting a failure associated with said LBT communication with respect to said at least one cell; and means for transmitting a signalling message to the PDCP entity, the signalling message comprising information indicating that LBT failure has been detected, for use by the PDCP entity in managing said LBT communication with the UE.

In one example aspect, the invention provides an apparatus configured to operate as a central unit of a base station for performing Listen-Before-Talk (LBT) communication with a user equipment (UE) via at least one cell, the apparatus comprising: means for receiving, from a distributed unit operating said at least one cell, a signalling message comprising information indicating that LBT failure has been detected; and means for managing said LBT communication with the UE based on the received information.

In one example aspect, the invention provides a base station apparatus for performing Listen-Before-Talk (LBT) communication with a user equipment (UE) via at least one cell of a Secondary Cell Group (SCG), the base station apparatus comprising: means for detecting a failure associated with said LBT communication with respect to said at least one SCG cell; and means for transmitting a signalling message to a Master Node, the signalling message comprising information indicating that LBT failure has been detected, initiating a procedure for deactivating the at least one SCG cell for which said LBT failure has been detected.

In one example aspect, the invention provides a base station apparatus for performing Listen-Before-Talk (LBT) communication with a user equipment (UE) via at least one cell, the base station apparatus comprising: means for detecting a failure associated with said LBT communication with respect to said at least one cell; and means for initiating a procedure for releasing a context associated with the UE in a core network by transmitting a UE Context Release Request message to a node of the core network, including information indicating that LBT failure has been detected.

In one example aspect, the invention provides a base station apparatus configured as a Packet Data Convergence Protocol (PDCP) entity for a user equipment (UE) for performing Listen-Before-Talk (LBT) communication via at least one cell, the base station apparatus comprising: means for receiving, from a base station apparatus configured to act as a corresponding node, information indicating that LBT failure has been detected with respect to said at least one cell; and means for performing a Self-Organizing Network (SON) procedure based on the received information.

example Aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Figure 1:
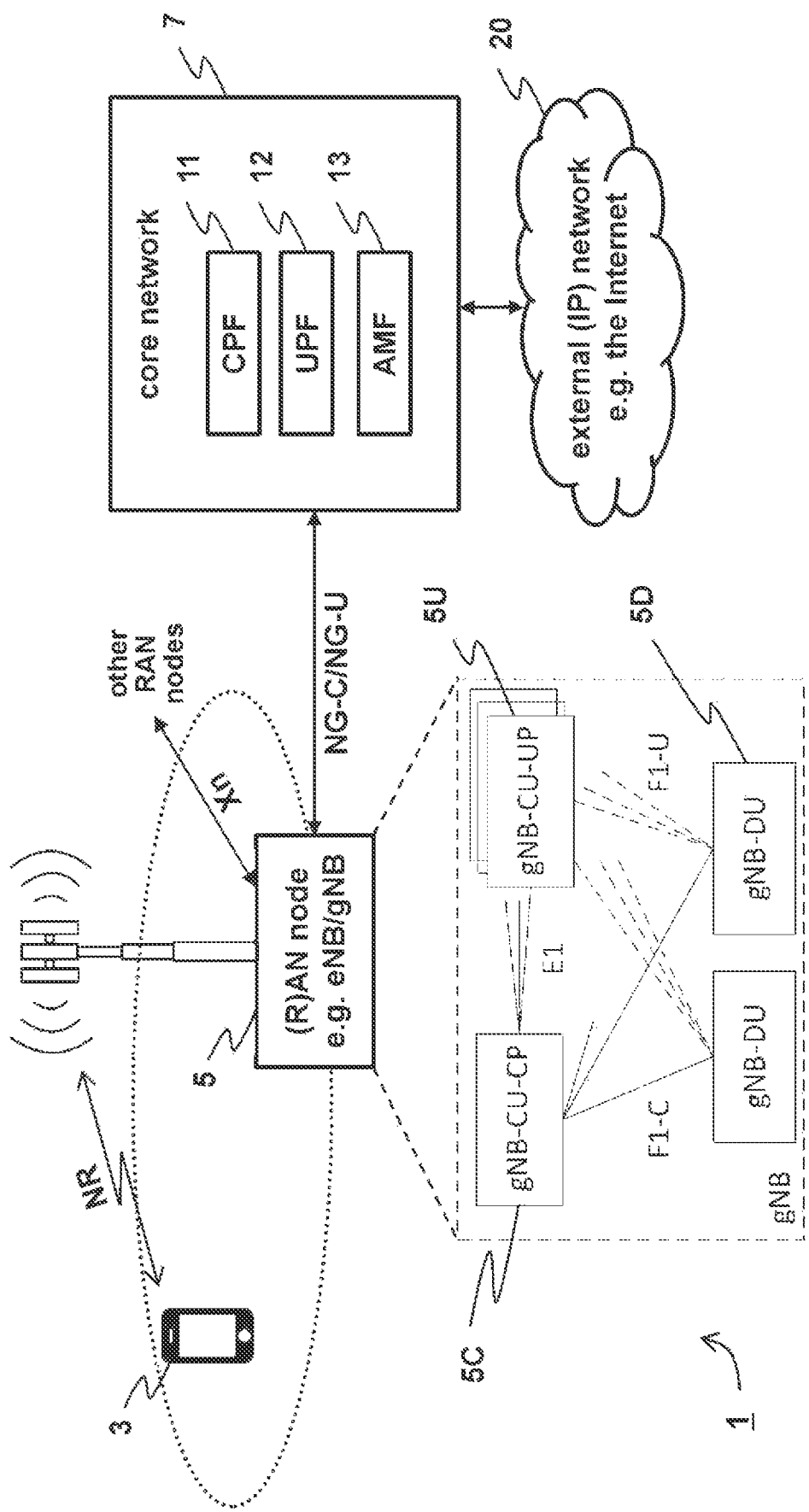
FIG. 1 illustrates schematically a mobile (cellular or wireless) telecommunication system to which example embodiments of the invention may be applied.

FIG. 1 schematically illustrates a mobile (cellular or wireless) telecommunication system 1 to which example embodiments of the present invention are applicable.

In this network, users of mobile devices 3 (UEs) can communicate with each other and other users via respective base stations 5 and a core network 7 using an appropriate 3GPP radio access technology (RAT), for example, a 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports Next Generation/5G protocols may be referred to as a 'gNBs'. It will be appreciated that some base stations 5 may be configured to support both 4G and 5G, and/or any other 3GPP or non-3GPP communication protocols.

It will be appreciated that the functionality of a gNB 5 (referred to herein as a 'distributed' gNB) may be split between one or more distributed units (DUs) and a central unit (CU) with a CU typically performing higher level functions and communication with the next generation core and with the DU performing lower level functions and communication over an air interface with UEs in the vicinity (i.e., in a cell operated by the gNB). A distributed gNB includes the following functional units:

gNB Central Unit (gNB-CU): a logical node hosting Radio Resource Control (RRC), Service Data Adaptation Protocol (SDAP) and Packet Data Convergence Protocol (PDCP) layers of the gNB (or RRC and PDCP layers of an en-gNB) that controls the operation of one or more gNB-DUs. The gNB-CU terminates the F1 interface connected with the gNB-DU.

gNB Distributed Unit (gNB-DU) 5D: a logical node hosting Radio Link Control (RLC), Medium Access Control (MAC) and Physical (PHY) layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP) 5C: a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

gNB-CU-User Plane (gNB-CU-UP) 5U: a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

The mobile device 3 and its serving base station 5 are connected via an appropriate air interface (for example the so-called 'NR' air interface, the 'Uu' interface, and/or the like). Neighbouring base stations 5 are connected to each other via an appropriate base station to base station interface (such as the so-called 'Xn' interface, the 'X2' interface, and/or the like). The base station 5 is also connected to the core network nodes via an appropriate interface (such as the so-called 'NG-U' interface (for user-plane), the so-called 'NG-C' interface (for control-plane), and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 11 and user plane functions (UPFs) 12. It will be appreciated that the core network 7 may also include, amongst others, an Access and Mobility Management Function (AMF) 13. From the core network 7, connection to an external IP network 20 (such as the Internet) may also be provided.

The NR user plane protocol is located in the User Plane of the Radio Network layer over either the Xn or the X2 or the F1 interface. The so-called corresponding node is a node interacting with a node (e.g., base station/gNB) hosting NR PDCP for flow control. In an Integrated Access and Backhaul (IAB) network, the corresponding node is the Distributed Unit of the IAB network (IAB-DU) serving the UE for the corresponding data radio bearer.

The nodes of this system are also configured to perform the Downlink Data Delivery Status and the Transfer of Assistance Information procedures defined in the 3GPP TS 38.425 V16.1.0. The purpose of the Downlink Data Delivery Status procedure is to provide feedback from the corresponding node to the node hosting the NR PDCP entity to allow the node hosting the NR PDCP entity to control the downlink user data flow via the corresponding node. The purpose of the Transfer of Assistance Information procedure is to provide assistance information to the node hosting the NR PDCP entity. Such information may be taken into consideration by the node hosting the NR PDCP entity for UP management and optimisation procedures.

The mobile device 3 (when in RRC_CONNECTED state) performs Radio Link Monitoring (RLM) in its active bandwidth part (BWP) based on reference signals (SSB/CSI-RS) and appropriate signal quality thresholds configured by the network (base station 5). SSB-based RLM is based on the SSB (Synchronisation Signal Block) associated to the mobile device's initial downlink (DL) BWP and it is configured for the initial DL BWP and for DL BWPs containing the SSB associated to the initial DL BWP. For other DL BWPs, RLM is performed based on Channel State Information Reference Signal (CSI-RS).

By performing the above described RLM procedures, the mobile device 3 is able to determine whether a Radio Link Failure (RLF) has occurred with respect to one of the cells used by the mobile device 3. For example, when the mobile device 3 detects consistent uplink LBT failures for operation with shared spectrum channel access, the mobile device 3 declares RLF.

It will be appreciated that the mobile device 3 may also declare RLF when one of the following criteria is met:

Expiry of a radio problem timer started after indication of radio problems from physical layer (if radio problems are recovered before the timer is expired, the UE stops the timer); or Expiry of a timer started upon triggering a measurement report for a measurement identity for which the timer has been configured while another radio problem timer is running; or Random access procedure failure; or Radio Link Control (RLC) failure.

Beneficially, the nodes of this system are configured to report DL LBT Failures and UL LBT Failures (e.g., on F1, Xn, NG, or E1 interface) which may be used for NR-U SON/MDT optimization and/or the like.

In one option, the distributed unit of the base station 5 (gNB-DU 5D) is configured to detect consistent downlink LBT failures (e.g., on one or more SCell(s) used by the mobile device 3) and report the LBT failures to the gNB-CU 5C. For example, reporting may be performed by initiating an appropriate UE context release procedure or by requesting cell deletion and/or cell addition. Thus, the gNB-DU 5D may be configured to send, to the gNB-CU 5C, an appropriately formatted signalling message (e.g., a 'UE Context Release Request' or a 'Configuration Update' message) including information identifying that LBT failures have been detected on the downlink. The information included in the signalling message may comprise an appropriate cause value (e.g., a cause value representing "DL_LBT_Failures" and/or the like). Accordingly, depending on the response from the gNB-CU 5C, the gNB-DU 5D is able to release the resources reserved for the SCell with consistent downlink LBT failures or deactivate the affected SCell(s). The gNB-CU 5C may also instruct the gNB-DU 5D (and/or another gNB-DU 5D) to activate other SCell(s) instead of (or in addition to) the SCell with the reported LBT failures.

In a scenario when the PDCP layer is hosted in one node with another node acting as the corresponding node, the above described Downlink Data Delivery Status or Assistance Information transfer procedure may be used to indicate (and alleviate) LBT failures. For example, the PDCP layer may be hosted by a gNB-CU-UP 5U in which case the gNB-DU 5D that operates the cell serving the mobile device 3 may act as the corresponding node. In another example, the PDCP layer may be hosted by a Master Node (MN) 5M and a Secondary Node (SN) 5S may act as the corresponding node, or vice versa.

In this scenario, the corresponding node may be configured to detect consistent downlink LBT failures (e.g., on one or more serving cell(s) used by the mobile device 3) and report the LBT failures to the node hosting the PDCP. In this case, the corresponding node may be configured to transmit i) an appropriately formatted 'DL Data Delivery Status' message (e.g., with a cause value indicating LBT Failures) or ii) an appropriately formatted 'Assistance Information Data' message (e.g., with a cause value indicating Consistent (or Average) LBT Failures). The node hosting the PDCP may proceed to initiate bearer context release/cell deactivation (e.g., using an appropriate cause value such as a cause value representing 'DL_LBT_Failures').

It will be appreciated that in another option, bearer context release/cell deactivation may involve a core network node, for example the AMF 13, in order to release the associated UE context in the core network. In this case the (R)AN node 5 that detects the LBT failures (e.g., the gNB-DU 5D, the MN 5M, or the SN 5S) may be configured to transmit an appropriately formatted signalling message (e.g., a 'UE Context Release Request') to the AMF 13 and include in this signalling message information identifying that LBT failures have been detected with respect to a cell (or cells) serving a particular mobile device 3. Beneficially, the signalling message from the (R)AN node 5 informs the AMF 13 that it can release the associated UE context.

In yet another option, the mobile device 3 may be configured to detect consistent uplink LBT failures (e.g., in the uplink direction on one or more SCell(s) used by the mobile device 3) and report the detected LBT failures to the base station 5 (e.g., a gNB-DU/MN/SN). Beneficially, the mobile device 3 may be configured to report these LBT failures to the base station 5 (gNB-DU/MN/SN) that operates a cell that is not affected by the detected LBT failures to ensure that the information is successfully received by the network. For example, reporting may be performed by the mobile device 3 transmitting a Medium Access Control (MAC) Control Element (CE) or an RRC signalling message to the base station 5.

Beneficially, the above described LBT failure reports may also be used for SON/MDT optimization, for example, for the purpose of identifying and avoiding those cells that are relatively more likely to suffer from LBT failures than other cells.

Mobile Device

Figure 2:
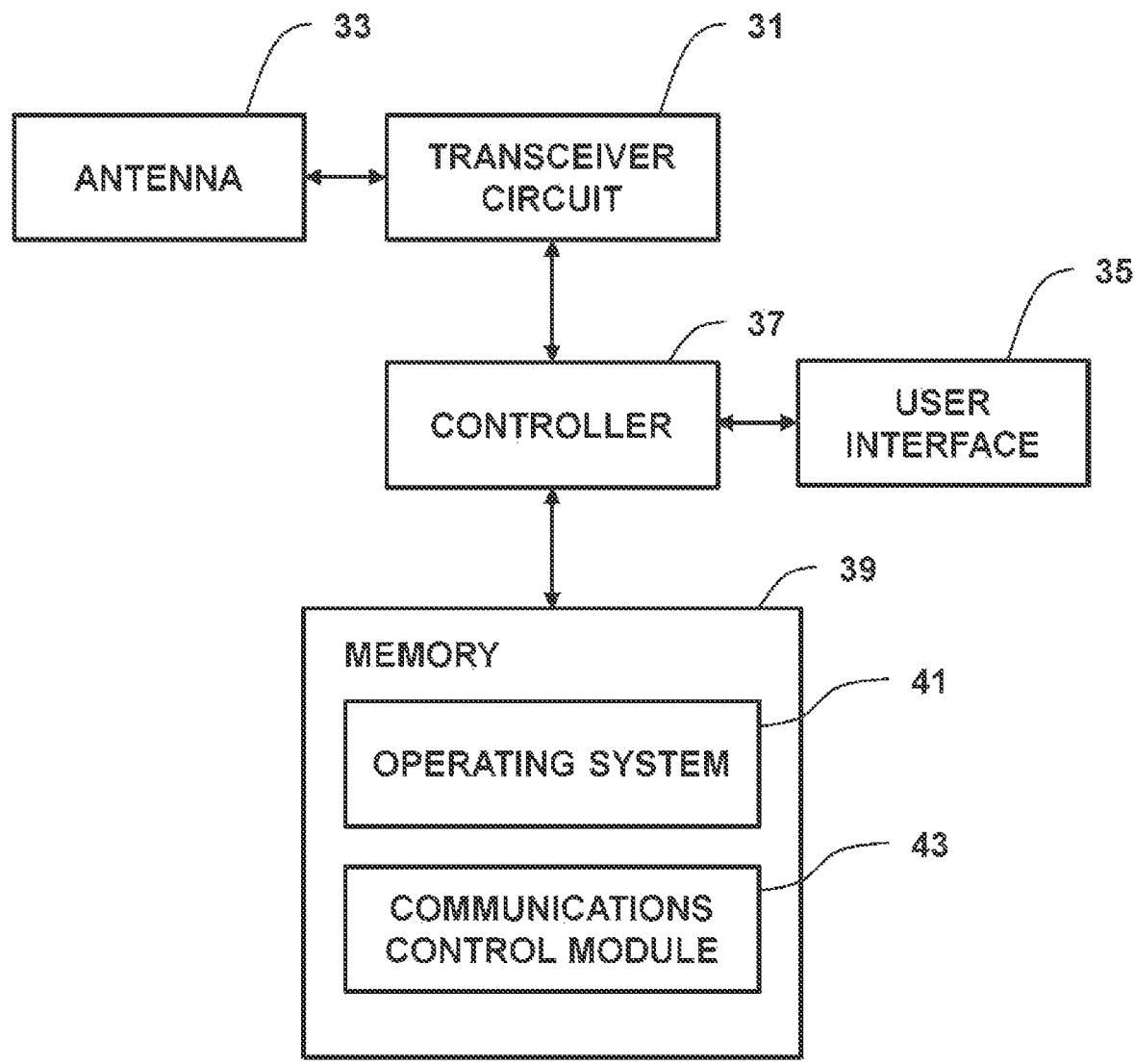
FIG. 2 is a block diagram of a User Equipment (UE) forming part of the system shown in FIG. 1.

FIG. 2 is a block diagram illustrating the main components of the mobile device 3 shown in FIG. 1 (e.g., a mobile telephone or an IoT device). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within memory 39. As shown, these software instructions include, among other things, an operating system 41, and a communications control module 43.

The communications control module 43 is operable to control the communication between the mobile device 3 and its serving base station 5 (and other communication devices connected to the serving base station 5, such as other user equipment, core network nodes, etc.).

It will be appreciated that the communications control module 43 may include a number of sub-modules (or 'layers') to support specific functionalities. For example, the communications control module 43 may include an LBT (Listen-Before-Talk) sub-module, a Medium Access Control (MAC) sub-module, a Radio Resource Control (RRC) sub-module, and a Non-Access Stratum (NAS) sub-module.

If present, the LBT sub-module is responsible for performing listen-before-talk communications using shared spectrum, and associated control signalling (e.g., for configuring the mobile device 3 for LBT operation). The LBT sub-module may be configured to detect LBT failures affecting a cell used by the mobile device 3 and to indicate such failures to other network nodes.

The RRC sub-module is operable to generate, send and receive signalling messages formatted according to the RRC standard. Similarly, the MAC sub-module is operable to generate, send and receive signalling messages (referred to as MAC 'Control Elements') formatted according to the MAC standard. Such messages and control elements are exchanged between the mobile device 3 and its serving base station 5. The RRC messages/MAC control elements may include, for example, information relating to LBT failures affecting a cell used by the mobile device 3.

The NAS sub-module is operable to generate, send and receive signalling messages formatted according to the NAS standard. For example, such messages are exchanged between the mobile device 3 and the AMF 13 (via the serving base station 5, using the RRC sub-module). The NAS messages may include, for example, information relating to LBT failures affecting a cell used by the mobile device 3.

Base Station

Figure 3:
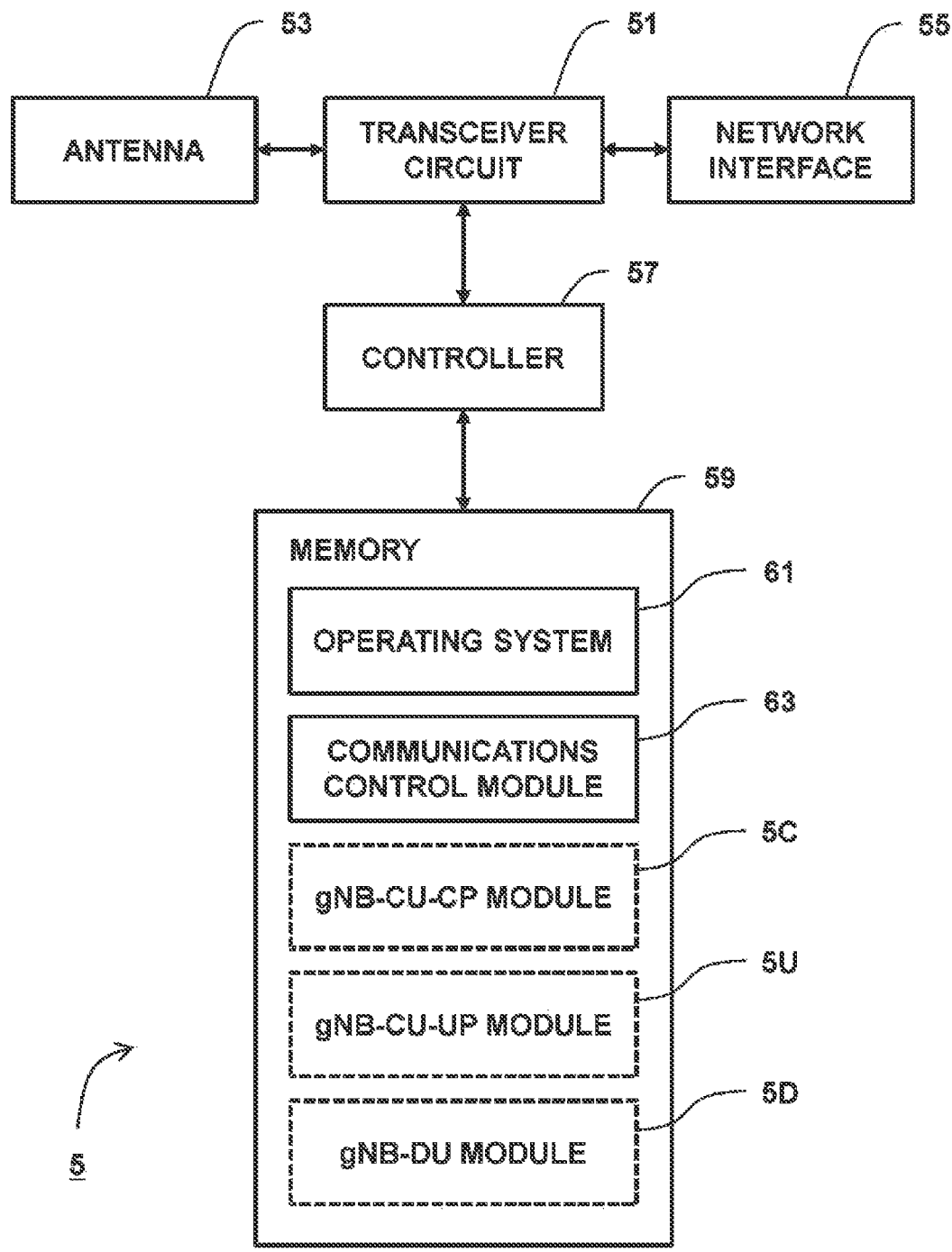
FIG. 3 is a block diagram of a base station forming part of the system shown in FIG. 1.

FIG. 3 is a block diagram illustrating the main components of a base station 5 shown in FIG. 1. As shown, the base station 5 has a transceiver circuit 51 for transmitting signals to and for receiving signals from user equipment (such as the mobile device 3) via one or more antenna 53, a core network interface 55 (e.g., NG-C/NG-U interface, and/or the like) for transmitting signals to and for receiving signals from the core network 7, and a base station interface 56 (e.g., Xn interface, and/or the like) for transmitting signals to and for receiving signals from neighbouring base stations. The base station 5 has a controller 57 to control the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, and at least a communications control module 63.

The communications control module 63 is responsible for handling (generating/sending/receiving) signalling between the base station 5 and other nodes, such as the UE 3 and the core network nodes. Such signalling may include, for example, control data for managing operation of the mobile device 3 (e.g., NAS, RRC, paging, system information, and/or the like).

When the base station 5 comprises a distributed gNB or en-gNB, the network interface 55 also includes an E1 interface and an F1 interface (F1-C for the control plane and F1-U for the user plane) to communicate signals between respective functions of the distributed gNB or en-gNB. In this case, the software also includes at least one of: a gNB-CU-CP module 5C, a gNB-CU-UP module 5U, and a gNB-DU module 5D. If present, the gNB-CU-CP module 5C hosts the RRC layer and the control plane part of the PDCP layer of the distributed gNB or en-gNB. If present, the gNB-CU-UP module 5U hosts the user plane part of the PDCP and the SDAP layers of the distributed gNB or the user plane part of the PDCP layer of the distributed en-gNB. If present, the gNB-DU module 5D hosts the RLC, MAC, and PHY layers of the distributed gNB or en-gNB.

It will be understood by a person skilled in the art that the central unit (e.g., 5C and/or 5U) may be implemented and physically located with the base station or may be implemented at a remote location, as a single physical element or as a cloud-based or virtualised system. It will also be understood that a single central unit may serve multiple base stations 5.

Although not shown in FIG. 3, the base station 5 will also typically include an RRC module, a base station to base station interface module (e.g., Xn), and a core network interface module.

The RRC module is operable to generate, send and receive signalling messages formatted according to the RRC standard. For example, such messages are exchanged between the base station 5 and the mobile device 3 (and other user equipment within the cell of the base station 5). The RRC messages may include, for example, messages relating to LBT failures affecting a cell used by the mobile device 3.

The base station to base station interface module is operable to generate, send and receive signalling messages (e.g., Xn messages) formatted according to the XnAP standard (or in some cases X2 messages formatted according to the X2AP standard). The XnAP messages may include, for example, messages relating to LBT failures affecting a cell used by the mobile device 3.

The core network interface module is operable to generate, send and receive signalling messages formatted according to the NG-C standard. For example, such messages are exchanged between the base station 5 and the AMF 13. The NG-C messages may include, for example, messages relating to LBT failures affecting a cell used by the mobile device 3.

Core Network Node

Figure 4:
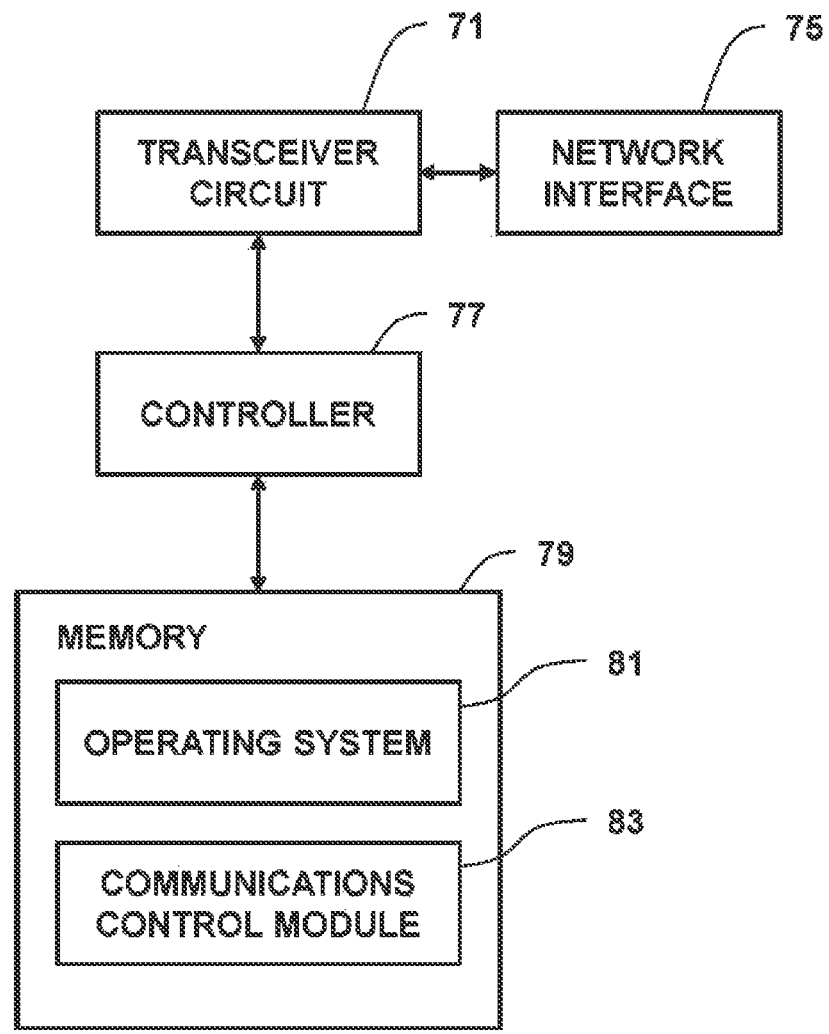
FIG. 4 is a block diagram of a core network node entity forming part of the system shown in FIG. 1.

FIG. 4 is a block diagram illustrating the main components of a generic core network node (or function) shown in FIG. 1, for example, the AMF 13. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, the (R)AN node 5, and other core network nodes. Such signaling may include appropriately formatted messages relating to LBT failures affecting a cell used by the mobile device 3.

Operation

A more detailed description will now be given (with reference to FIGS. 5 to 15) of various ways in which reporting of LBT Failures may be performed in the system shown in FIG. 1.

First Scenario

Figure 5:
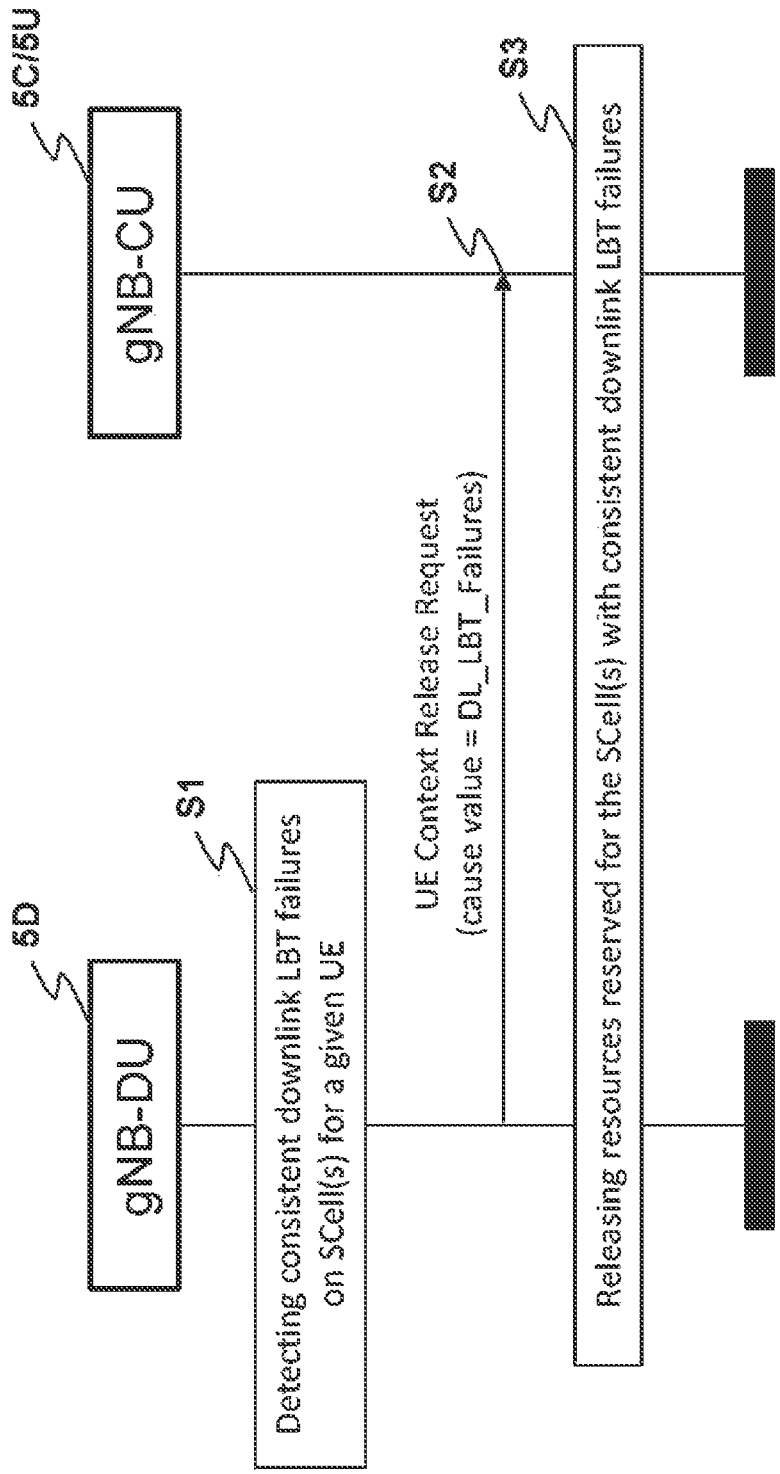
FIG. 5 is a schematic signalling (timing) diagram illustrating exemplary ways in which example embodiments of the invention can be implemented in the system of FIG. 1.

FIG. 5 is a timing diagram (message sequence chart) illustrating a first example process performed by the components of the system 1 for reporting of LBT failures. In this case, reporting is performed using the UE context release procedure (over the F1 interface).

In more detail, as generally shown in step S1, the distributed unit 5D of the base station 5 is configured to detect (using its LBT sub-module) consistent downlink LBT failures on one or more SCell(s) used by the mobile device 3.

When LBT failure is detected, the gNB-DU 5D proceeds to step S2 and reports the LBT failures to the gNB-CU 5C. In this case, the gNB-DU 5D generates and transmits, to the gNB-CU 5C, an appropriately formatted signalling message (e.g., a 'UE Context Release Request') including information identifying that LBT failures have been detected on the downlink. The information identifying or relating to the downlink LBT failures may comprise a cause value representing "DL_LBT_Failures" and/or the like.

In step S3, the base station 5 (gNB-CU 5C/gNB-DU 5D) releases the resources reserved for the SCell with consistent downlink LBT failures. This may comprise for example the base station 5 transmitting an appropriately formatted RRC message (e.g., an RRCReconfiguration message and/or the like) to the mobile device 3, including information identifying the SCell to be released.

Second Scenario

Figure 6:
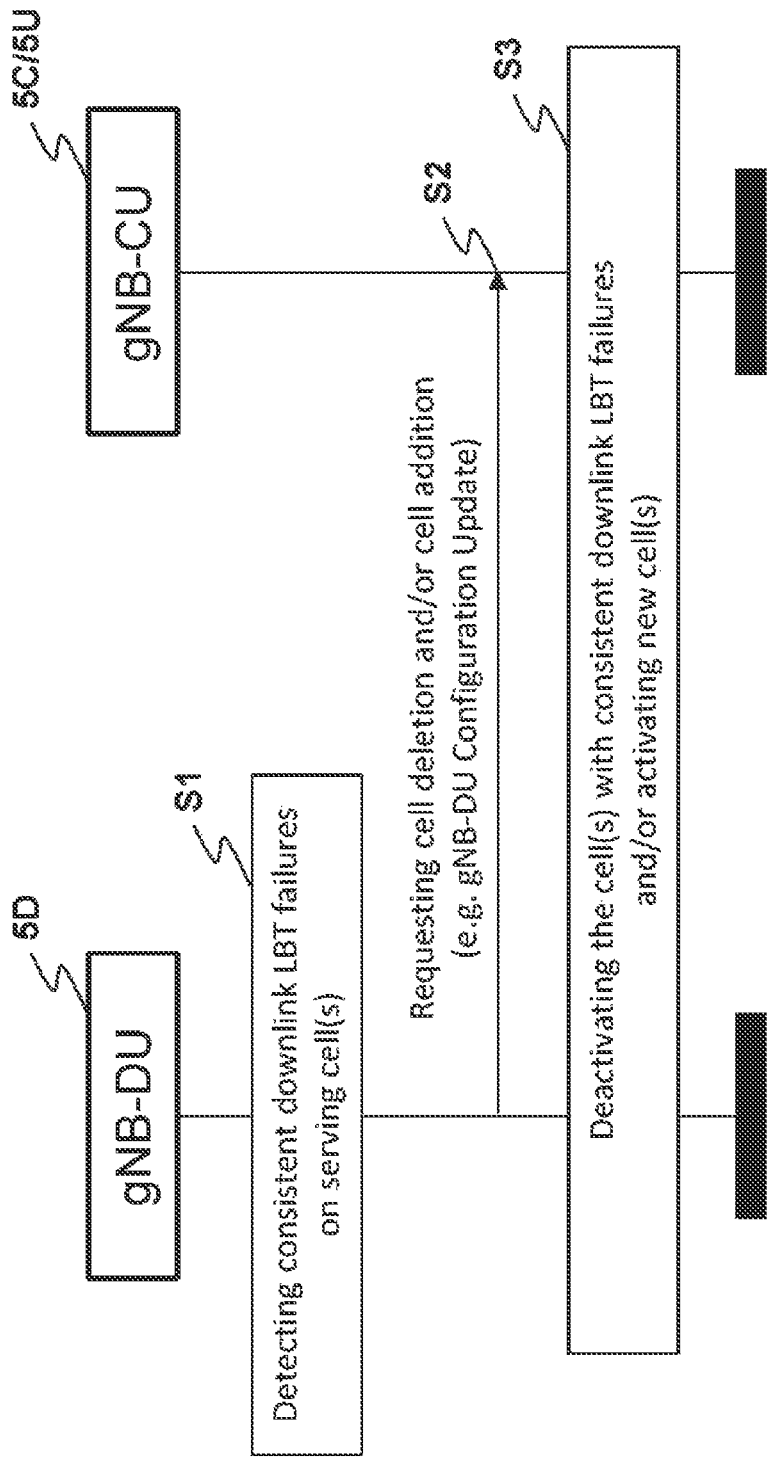
FIG. 6 is a schematic signalling (timing) diagram illustrating exemplary ways in which example embodiments of the invention can be implemented in the system of FIG. 1.

FIG. 6 is a timing diagram (message sequence chart) illustrating a second example process performed by the components of the system 1 for reporting of LBT failures. In this case, reporting is performed by requesting cell deletion and/or cell addition (over the F1 interface). Similarly to the first scenario, the distributed unit 5D of the base station 5 is configured to detect (using its LBT sub-module) consistent downlink LBT failures on one or more serving cell(s).

When LBT failure is detected (in step S1), the gNB-DU 5D proceeds to step S2 and reports the LBT failures to the gNB-CU 5C. In this case, the gNB-DU 5D generates and transmits, to the gNB-CU 5C, an appropriately formatted 'Configuration Update' message including information identifying that LBT failures have been detected on the downlink (e.g., a cause value representing "DL_LBT_Failures" and/or the like). Specifically, the message may comprise a 'gNB-DU Configuration Update' message. In order to assist the gNB-CU 5C, the gNB-DU 5D includes in this message information identifying the cell(s) with downlink LBT failures in the list of cells to be deleted.

In step S3, the base station 5 (gNB-CU 5C/gNB-DU 5D) deactivates the affected cell(s). This is realised by the gNB-CU 5C generating and sending an appropriate (gNB-DU) Configuration Update Acknowledge message to the gNB-DU 5D. The gNB-CU 5C may also instruct the gNB-DU 5D (and/or another gNB-DU 5D) to activate other cell(s) instead of (or in addition to) the serving cell(s) with the reported LBT failures.

Third Scenario

Figure 7:
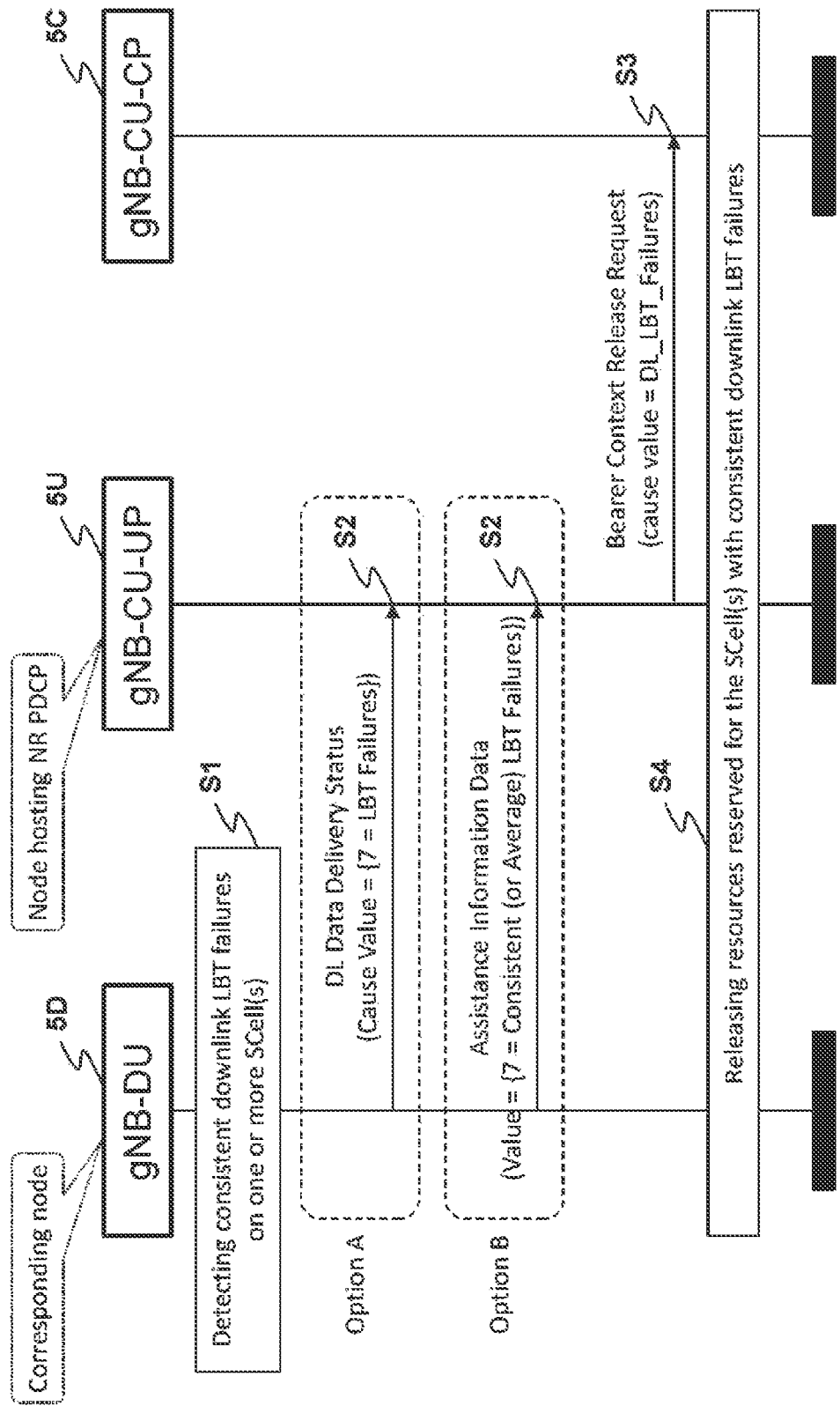
FIG. 7 is a schematic signalling (timing) diagram illustrating exemplary ways in which example embodiments of the invention can be implemented in the system of FIG. 1.

FIG. 7 is a timing diagram (message sequence chart) illustrating a third example process performed by the components of the system 1 for reporting of LBT failures. In this scenario, the corresponding node is configured to detect consistent downlink LBT failures on one or more SCell(s) used by the mobile device 3. Reporting is performed over the F1 and E1 interfaces.

In the example illustrated in FIG. 7, the gNB-CU-UP 5U hosts the NR PDCP layer and the gNB-DU 5D acts as the corresponding node.

As generally shown in step S1, the distributed unit 5D of the base station 5 (the corresponding node) detects consistent downlink LBT failures on one or more SCell(s) used by the mobile device 3.

In step S2, the gNB-DU 5D reports the downlink LBT failures to the gNB-CU-UP 5U using the User Plane protocol F1-U. As can be seen, there are two options to do so.

In one option (denoted Option A in FIG. 7), the gNB-DU 5D generates and sends, to the gNB-CU-UP 5U, an appropriately formatted 'DL Data Delivery Status' frame of the F1-U protocol. The gNB-DU 5D includes in the DL Data Delivery Status frame a suitable cause value indicating LBT failures.

For example, the cause value reporting/indicating LBT failures may be defined in section 5.5.3.23 of 3GPP TS 38.425 as follows:

TABLE 1

5.5.3.23 Cause Value

Description: This parameter indicates specific events reported by the corresponding node.
Value range: (0=UNKNOWN, 1=RADIO LINK OUTAGE, 2=RADIO LINK RESUME, 3=UL RADIO LINK OUTAGE, 4=DL RADIO LINK OUTAGE, 5=UL RADIO LINK RESUME, 6=DL RADIO LINK RESUME, 7 = LBT Failures, 8-228=reserved for future value extensions, 229-255=reserved for test purposes)
Field length: 1 octet.

Whilst in this example cause value=7 is suggested, it will be appreciated that any other suitable cause value may be used, for example one of the cause values reserved for future use.

In another option (denoted Option B in FIG. 7), the corresponding node generates and sends, to the node hosting the NR PDCP entity, an appropriately formatted 'Assistance Information Data' frame of the F1-U protocol. The Assistance Information Data frame includes a suitable cause value indicating LBT failures. For example, the cause value reporting/indicating LBT failures may be defined in section 5.5.3.38 of 3GPP TS 38.425 as follows:

TABLE 2

5.5.3.38 Assistance Information Type

Description: This field describes the type of radio quality assistance information provided, if supported, by the corresponding node to the node hosting the NR PDCP entity. The DL Radio Quality Index is a numerical index expressing the radio quality of the data radio bearer or the RLC entity in DL, where the value 0 represents the lowest quality. The UL Radio Quality Index is a numerical index expressing the radio quality of the data radio bearer or the RLC entity in UL, where the value 0 represents the lowest quality. The averaging window for the Average CQI, Average HARQ Failure and Average HARQ Retransmission is set by means of configuration. Power Headroom Report is PHR MAC control element reported by as defined in 3GPP TS 36.321[4] and 3GPP TS 38.321[5]. The Consistent (or Average) LBT Failure is set when corresponding node detected a certain number of DL LET Failures.
Value range: (0=UNKNOWN, 1=Average CQI, 2=Average HARQ Failure, 3=Average HARQ Retransmissions, 4= DL Radio Quality Index, 5= UL Radio Quality Index, 6= Power Headroom Report, 7=Consistent (or Average) LBT Failures, 8-228=reserved for future value extensions, 229-255=reserved for test purposes).

Whilst in this example cause value=7 is suggested, it will be appreciated that any other suitable cause value may be used, for example one of the cause values reserved for future use.

Upon receipt of the indication (cause value) in step S2, the gNB-CU-UP 5U (hosting the NR PDCP) generates and sends, in step S3, an appropriately formatted message (e.g., a 'Bearer Context Release Request' and/or the like) and includes a cause value (e.g., DL_LBT_Failures) or any other suitable information indicating LBT failures.

Based on this cause value/indication, the gNB-CU-CP 5C is able to initiate release of the resources affected by downlink LBT failures (step S4).

In summary, the node hosting the NR PDCP entity (in this example the gNB-CU-UP 5U/NB-CU-CP 5C) may take the received information (cause value) into account in its decision on whether or not to keep the associated bearer context.

Fourth Scenario

Figure 8:
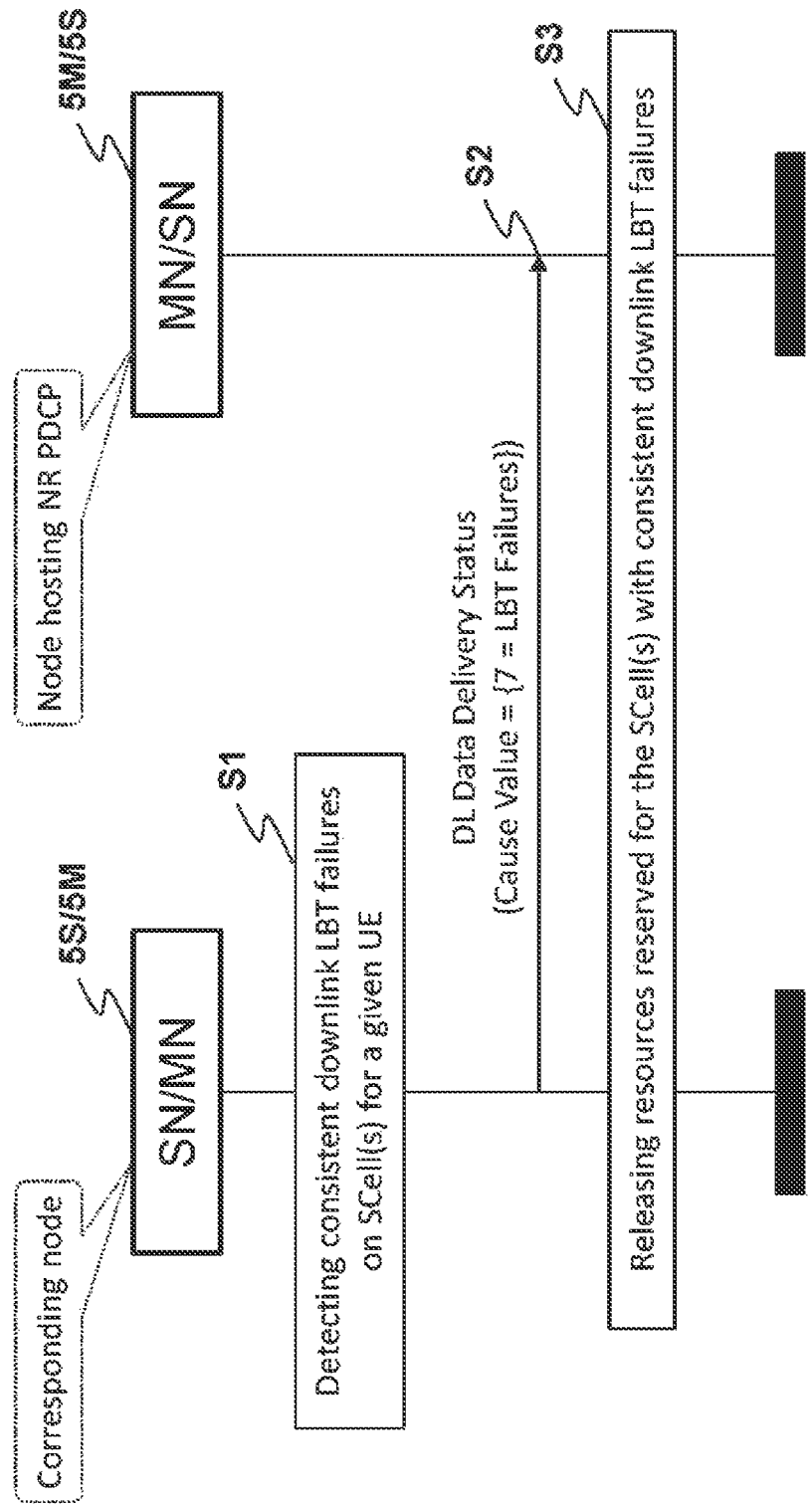
FIG. 8 is a schematic signalling (timing) diagram illustrating exemplary ways in which example embodiments of the invention can be implemented in the system of FIG. 1.
Figure 9:
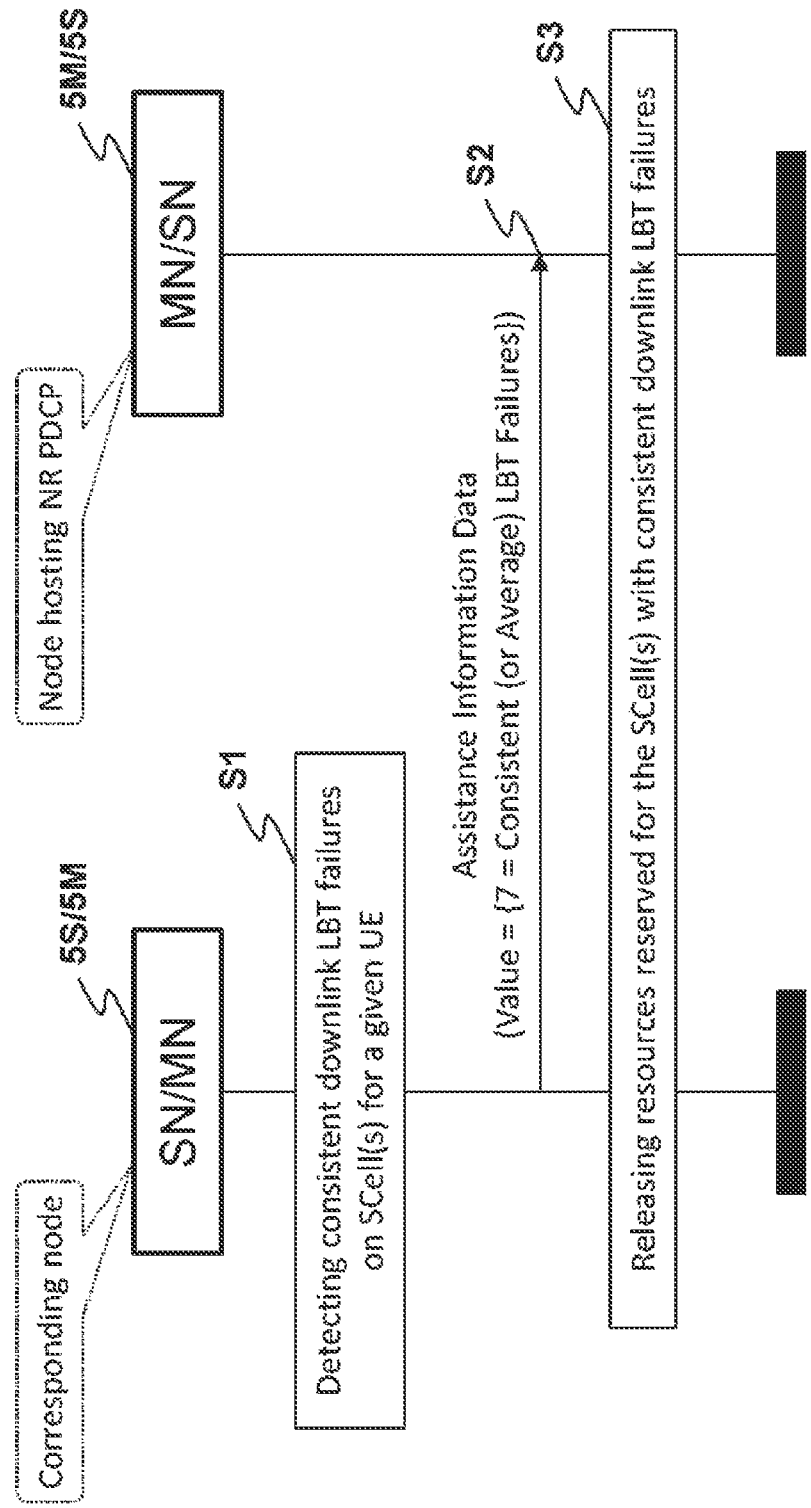
FIG. 9 is a schematic signalling (timing) diagram illustrating exemplary ways in which example embodiments of the invention can be implemented in the system of FIG. 1.

FIGS. 8 and 9 are timing diagrams (message sequence charts) illustrating further exemplary processes performed by the components of the system 1 for reporting of LBT failures. In this scenario, the corresponding node (which detects consistent downlink LBT failures) is located in either an MN 5M or an SN 5S. Reporting is performed over the interface between the MN 5M and the SN 5S (e.g., Xn or X2 interface) in a similar manner as Options A and B of FIG. 7 described above.

In more detail, when the PDCP layer is hosted by a Master Node (MN) 5M, a Secondary Node (SN) 5S may act as the corresponding node, or vice versa. The corresponding node is configured to detect consistent downlink LBT failures on one or more serving cell(s) used by the mobile device 3 (step S1) and report the LBT failures to the node hosting the PDCP (step S2).

In the example shown in FIG. 8, the corresponding node transmits an appropriately formatted 'DL Data Delivery Status' message (which effectively corresponds to Option A of FIG. 7) and in the example shown in FIG. 9, the corresponding node transmits an appropriately formatted 'Assistance Information Data' message (which effectively corresponds to Option B of FIG. 7).

As generally shown in step S3, the node hosting the PDCP initiates release of the resources affected by downlink LBT failures.

Fifth Scenario

Figure 10:
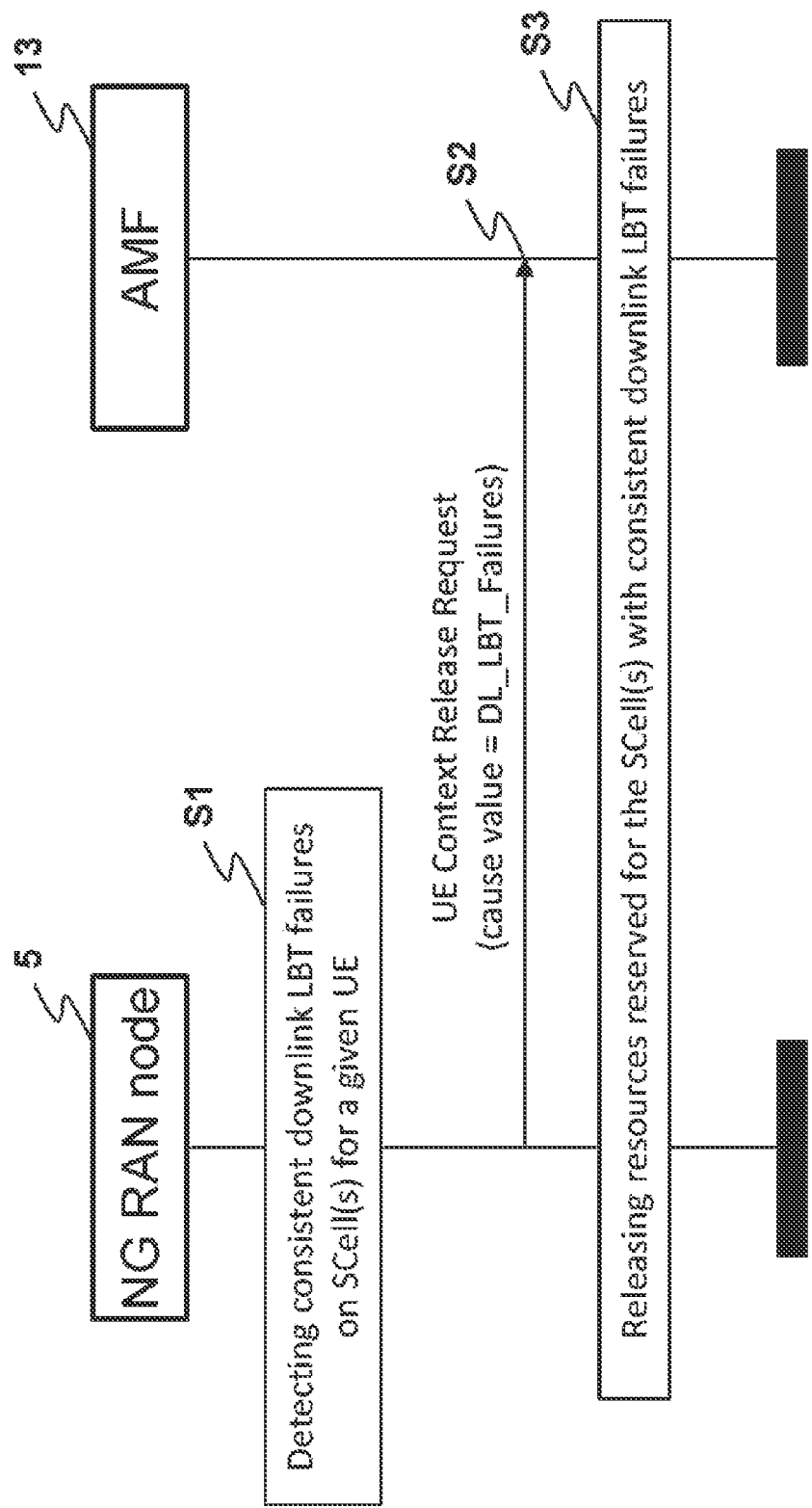
FIG. 10 is a schematic signalling (timing) diagram illustrating exemplary ways in which example embodiments of the invention can be implemented in the system of FIG. 1.

FIG. 10 is a timing diagram (message sequence chart) illustrating another example process performed by the components of the system 1 for reporting of LBT failures. In this scenario, reporting of LBT failures and subsequent release of resources/cell deactivation involves a node of the core network 7, for example the AMF 13. Reporting is performed over the NG interface (e.g., 'NG-C' shown in FIG. 1).

In this case the (R)AN node 5 that detects the LBT failures (e.g., the gNB-DU 5D, the MN 5M, or the SN 5S) is configured to transmit an appropriately formatted signalling message (e.g., a 'UE Context Release Request') to the AMF 13 and include in this signalling message information identifying that LBT failures have been detected with respect to a cell (or cells) serving a particular mobile device 3.

Accordingly, as generally shown in step S3, the AMF 13 and the (R)AN node 5 perform appropriate procedures to release (or move) resources reserved for the mobile device 3 on the cell(s) for which consistent downlink LBT failures have been reported.

Sixth Scenario

Figure 11:
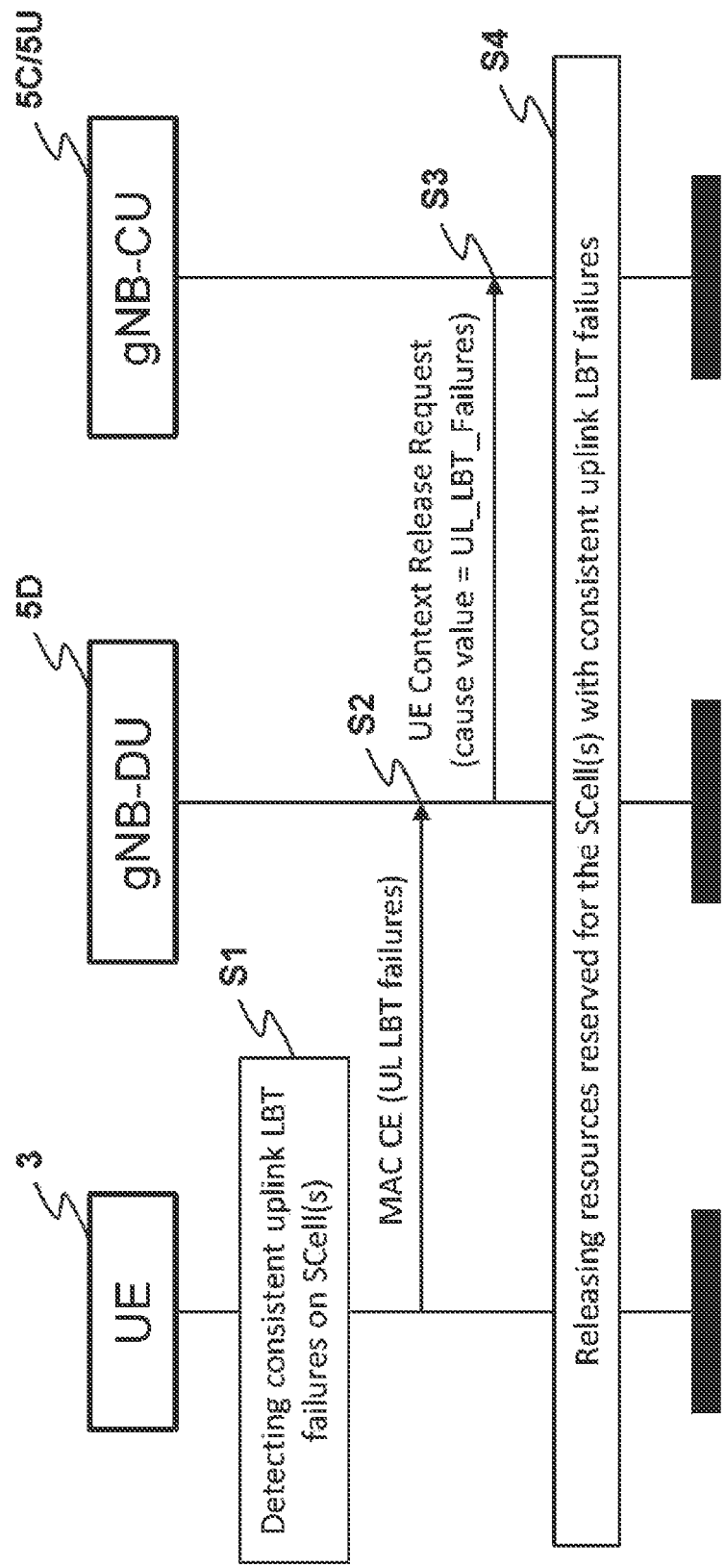
FIG. 11 is a schematic signalling (timing) diagram illustrating exemplary ways in which example embodiments of the invention can be implemented in the system of FIG. 1.
Figure 12:
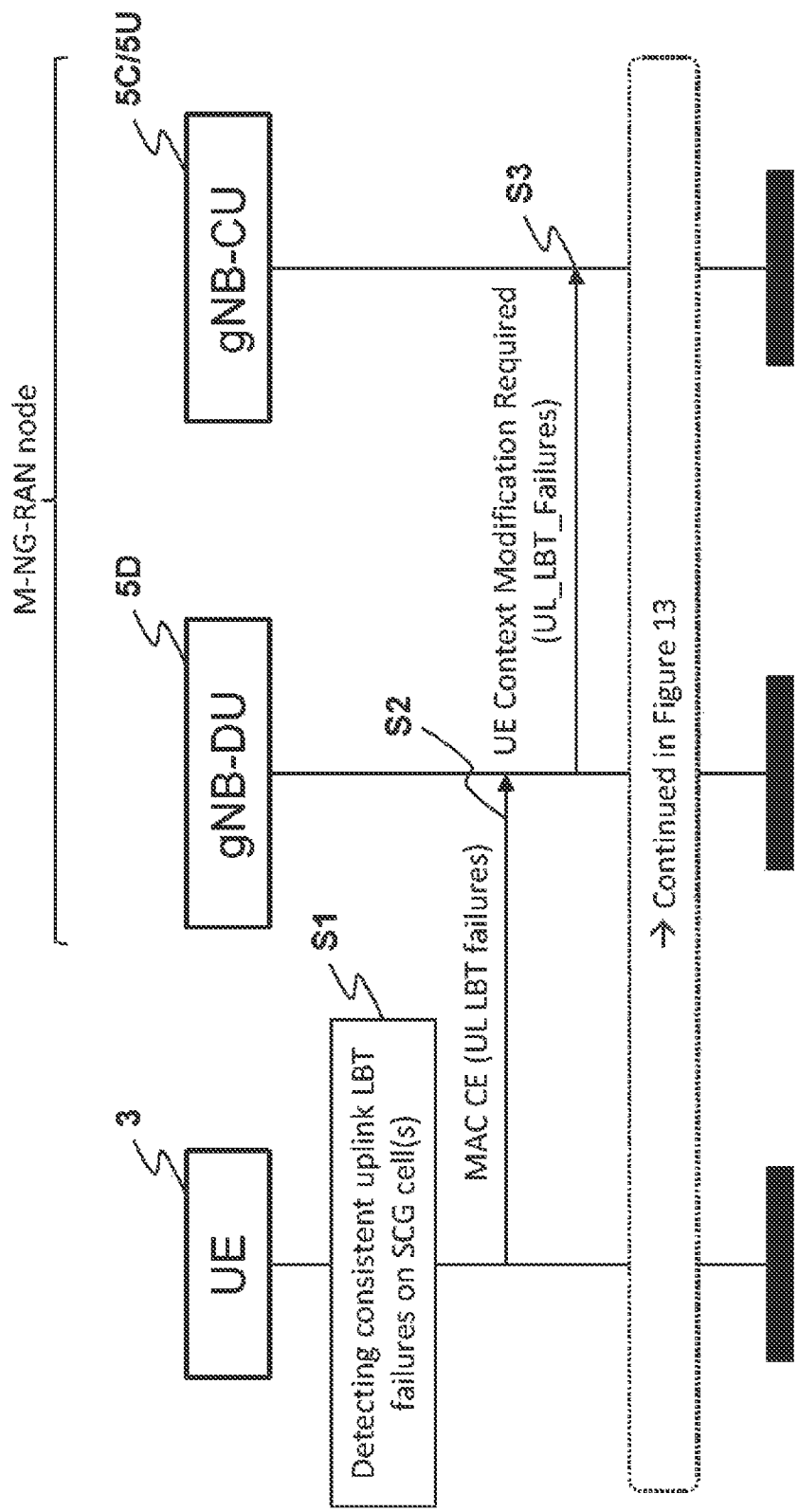
FIG. 12 is a schematic signalling (timing) diagram illustrating exemplary ways in which example embodiments of the invention can be implemented in the system of FIG. 1.
Figure 13:
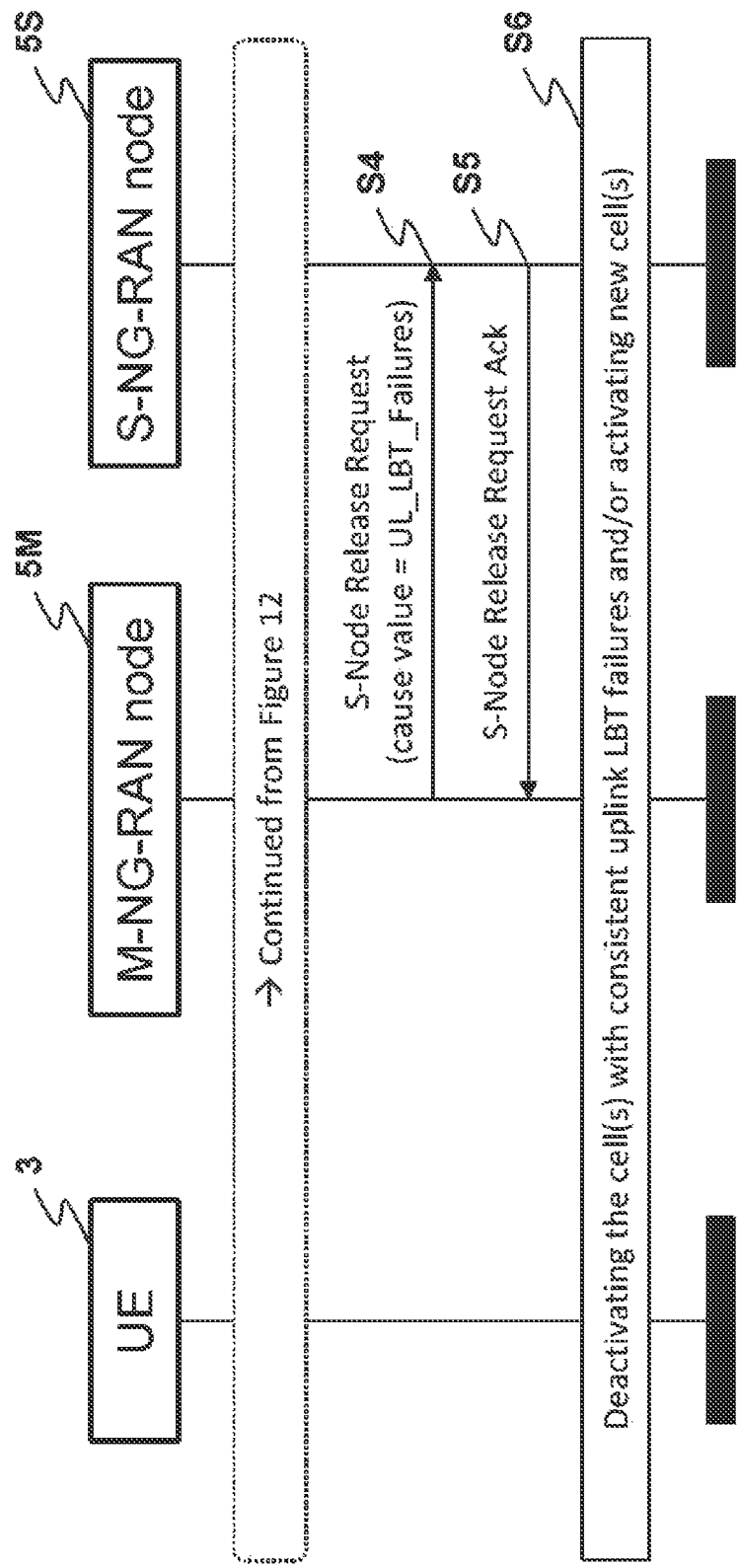
FIG. 13 is a schematic signalling (timing) diagram illustrating exemplary ways in which example embodiments of the invention can be implemented in the system of FIG. 1.

FIGS. 11 to 13 illustrate two more exemplary processes for reporting LBT failures. In these examples, detection of LBT failures is performed by the mobile device 3 (e.g., detection of LBT failures on the uplink).

In more detail, when the mobile device 3 detects consistent LBT failures (in the uplink direction in this example) on one or more SCell(s) used by the mobile device 3 (step S1), the mobile device 3 reports (step S2) the detected LBT failures to the base station 5. In the examples shown in FIGS. 11 and 12, the mobile device 3 reports the detected LBT failures to a gNB-DU 5D by transmitting an appropriately formatted MAC CE. If no resources are available to transmit the MAC CE, then the mobile device 3 may transmit a Scheduling Request (SR) in order to report the LBT failures using resources allocated to it by the base station 5. Preferably, the mobile device 3 transmits the MAC CE (or SR) to a gNB-DU 5D with a cell that is not affected by the detected LBT failures to ensure that the information is successfully received by the network.

In step S3 of FIG. 11, based on the MAC CE (or SR) from the mobile device 3, the gNB-DU 5D generates and transmits, to the gNB-CU, an appropriately formatted 'UE Context Release Request' message (and/or the like) including a cause value (e.g., "UL_LBT_Failures" or any other suitable cause value/information element) indicating that uplink LBT failures have been detected by the mobile device 3.

Accordingly, as generally shown in step S4, the base station 5 and the mobile device 3 perform appropriate procedures to release resources reserved for the mobile device 3 on the cell(s) for which consistent uplink LBT failures have been reported.

Turning now to FIG. 12, in this example the detected LBT failures relate to a cell of a Secondary Cell Group (SCG). In step S3 the gNB-DU 5D generates and transmits, to the gNB-CU of the Master Node, an appropriately formatted 'UE Context Modification Required' message (and/or the like) including a cause value (e.g., "UL_LBT_Failures" or any other suitable cause value/information element) indicating that uplink LBT failures have been detected by the mobile device 3. The message is step S3 may include (e.g., in an information element) any additional information from the mobile device 3 or the gNB-DU 5D (MN) relating to the detected uplink LBT failures.

The procedure continues in FIG. 13, in which the Master Node 5M (gNB-CU) generates and transmits, in step S4, an appropriately formatted 'S-Node Release Request' message to the Secondary Node 5S, indicating the reason for this request (e.g., cause value=UL_LBT_Failures). In step S5, the Secondary Node 5S responds to this request by transmitting an 'S-Node Release Request Acknowledge'.

In step S6, in accordance with the request in step S4, the SN 5S (denoted 'S-NG-RAN node') and the mobile device 3 perform appropriate procedures to release the SCG cell for which consistent uplink LBT failures have been detected. It will be appreciated that the MN 5 may configure the mobile device 3 for using a difference SCG cell (via the same Secondary Node or a different one), effectively replacing the SCG cell having LBT failures with a different cell.

Seventh Scenario

Figure 14:
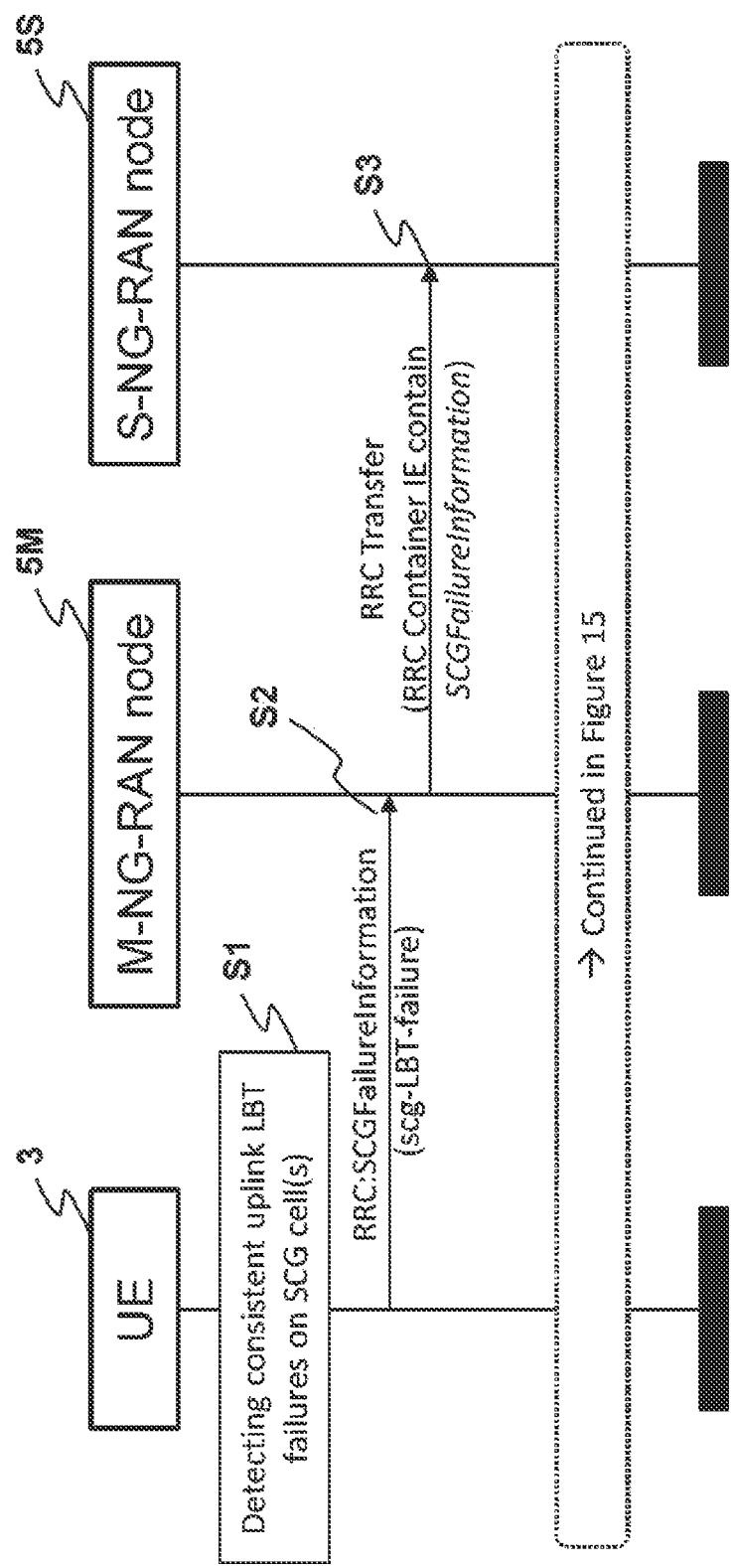
FIG. 14 is a schematic signalling (timing) diagram illustrating exemplary ways in which example embodiments of the invention can be implemented in the system of FIG. 1.
Figure 15:
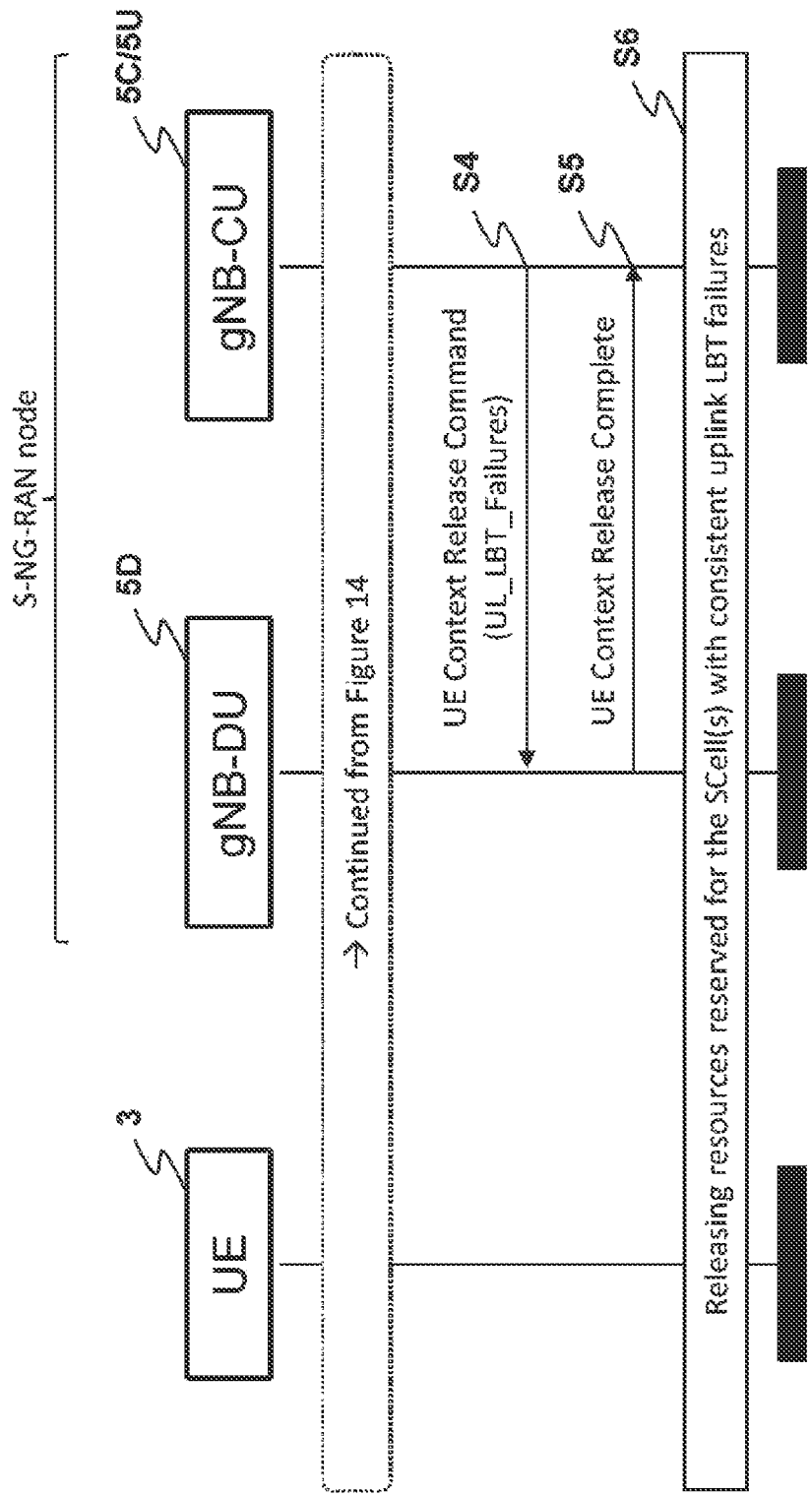
FIG. 15 is a schematic signalling (timing) diagram illustrating exemplary ways in which example embodiments of the invention can be implemented in the system of FIG. 1.

FIGS. 14 and 15 illustrate an exemplary process (timing diagram) for reporting LBT failures using RRC signalling.

Step S1 corresponds to step S1 of FIG. 12. In the next step (S2), the mobile device 3 generates and sends, to the MN 5M (denoted as M-NG-RAN node), an appropriately formatted RRC message (e.g., an 'UL-DCCH-Message' and/or the like) and includes in this message information about the LBT failures detected on a cell of a Secondary Cell Group (SCG). For example, the information may be included in an 'scg-LBT-failure' information element (IE) of the so-called 'SCGFailureInformation' message. The MN 5M sends, in step S3, the received SCGFailureInformation message to the SN 5S (denoted as S-NG-RAN node) in an RRC Transfer message, using an appropriately formatted RRC Container IE (as shown below).

TABLE 3

| RRC Container information element | | | |
|---|---|---|---|
| >RRC Container | M | OCTET STRING | For NGEN-DG and NR-DC, includes the UL-DCCH Message as defined in subclause 6.2.1 of TS 38.331 containing the MeasurementReport message or the FailureInformation message of SCGFailureInformation message. For NE-DC, includes the UL-DCCH-Message as defined in subclause 6.2.1 of TS 36.331 containing the MeasurementReport message. |

The procedure continues in FIG. 15, in which the Secondary Node 5S (gNB-CU) generates and transmits, in step S4, an appropriately formatted 'UE Context Release Command' message to the gNB-DU 5D, indicating the reason for this request (e.g., cause value=UL_LBT_Failures). In step S5, the gNB-DU responds to this request by transmitting an 'UE Context Release Complete' message.

Accordingly, as generally shown in step S6, the Secondary Node 5S and the mobile device 3 perform appropriate procedures to release resources reserved for the mobile device 3 on the cell(s) for which consistent uplink LBT failures have been reported.

Eighth Scenario

Figure 16:
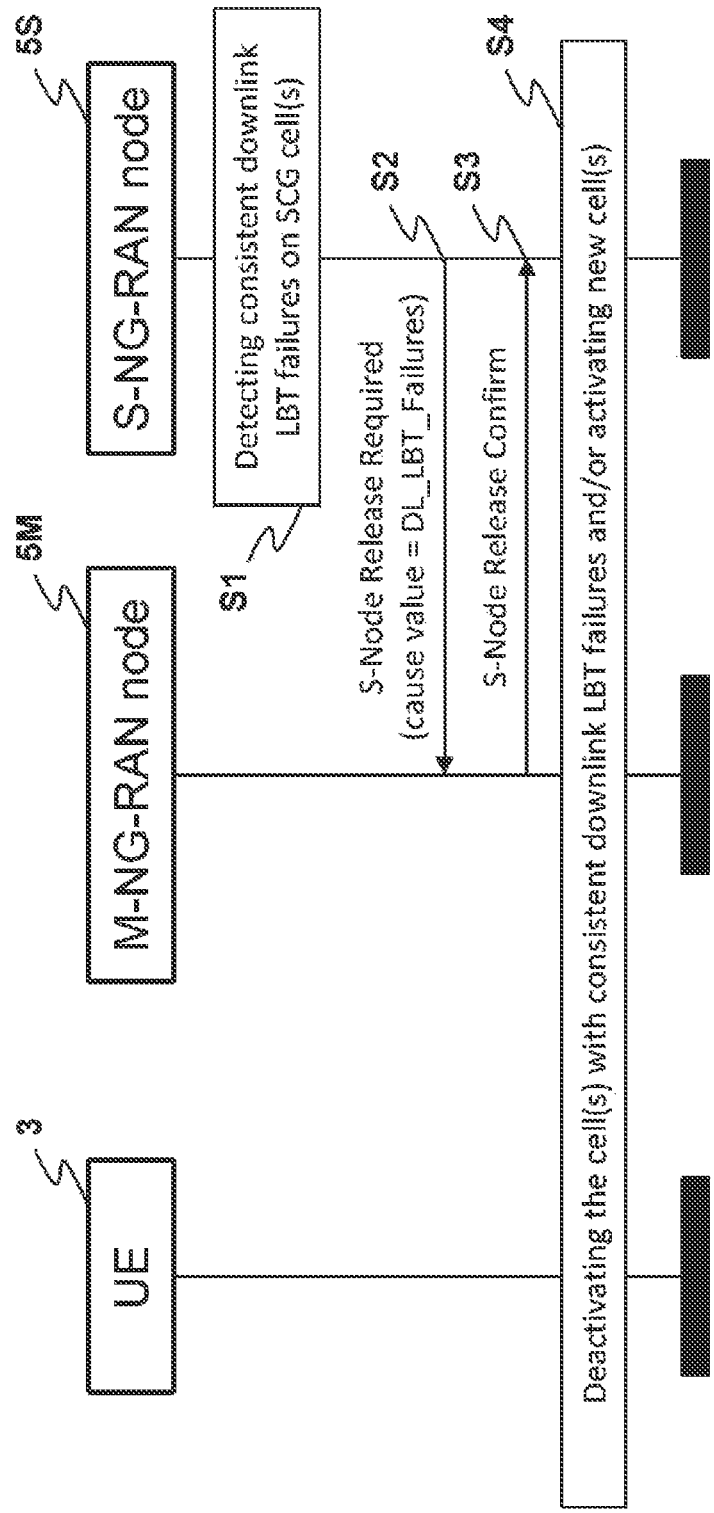
FIG. 16 is a schematic signalling (timing) diagram illustrating exemplary ways in which example embodiments of the invention can be implemented in the system of FIG. 1.

FIG. 16 is a timing diagram (message sequence chart) illustrating a variation of the example shown in FIGS. 12 and 13. In this scenario, the Secondary Node detects LBT failures (on downlink) and initiates release of the affected SCG cell(s).

In response to detecting downlink LBT failures in step S1, the Secondary Node 5S generates and transmits, in step S2, an appropriately formatted 'S-Node Release Required' message to the Master Node 5M, and indicates the reason for this request (e.g., cause value=DL_LBT_Failures). In step S3, the Master Node 5M responds to this request by transmitting an 'S-Node Release Confirm' message. The nodes then proceed to step S4 which is similar to step S6 of FIG. 13.

Measurements Collected for SON Optimization

Whilst the above described LBT failure reporting methods are beneficial for releasing/reconfiguring cell resources affected by the LBT failures, it will be appreciated that the same (or similar) information may also be used for SON optimization.

For example, the gNB-CU may configure the gNB-DU to perform measurements on LBT failures and to report the results of such measurements. In order to do so, the gNB-CU may generate and transmit an appropriately formatted Resource Status Request message to the gNB-DU.

In one option, the Resource Status Request message may include information (e.g., one of the bits of the message may be set to an appropriate value) that indicates that the recipient of this message is required to perform LBT failure reporting. In turn, the gNB-DU reports, for example, the number of LBT failures detected, using an appropriately formatted Resource Status Update message. For example, the Resource Status Update message may include a 'Number of UL LBT Failures detected' information element (and/or the like).

TABLE 4

| RESOURCE STATUS REQUEST message | | | | | |
|---|---|---|---|---|---|
| Report Characteristics | C- ifRegistration RequestStart | BIT STRING (SIZE(32)) | Each position in the bitmap indicates measurement object the gNB-DU is requested to report. First Bit = PRB Periodic Second Bit = TNL Capacity Ind Periodic, Third Bit = Composite Available Capacity Periodic, Fourth Bit = HW LoadInd | YES | ignore |

TABLE 4-continued

| RESOURCE STATUS REQUEST message |
|---|
| Periodic. Fifth Bit = Number of Active UEs Sixth Bit = report the LBT Failures, Other bits shall be ignored by the gNB-DU. |

TABLE 5

| RESOURCE STATUS UPDATE message | | | | |
|---|---|---|---|---|
| Cell Measurement Result | 0..1 | | | YES ignore |
| >Cell Measurement Result Item | 1 | <maxCellingNBDU> | .. | — |
| >>Cell ID | M | | NR CGI 9.3.1.12 | — |
| >>Number of UL LBT Failures detected | O | | INTEGER (0..256, ...) | — |

In another option, the gNB-CU may configure the gNB-DU to report measurements on LBT failures when the number of detected LBT failures exceeds a certain number/threshold. This may be configured using for example an 'LBT Failure Report Configuration' information element (and/or any other suitable information element), as shown below. When appropriate, the gNB-DU may report, as a result of the requested measurement, the number of LBT failures detected (e.g., in an 'LBT Failures detected' information element) in an appropriately formatted Resource Status Update message.

TABLE 6

| RESOURCE STATUS REQUEST message | | | | | |
|---|---|---|---|---|---|
| LBT Failure Report Configuration | C- ifLBT_failure | ENUMERATED (1, 10, 100, ...) | report when number of time detection | YES | ignore |

TABLE 7

| RESOURCE STATUS UPDATE message | | | | |
|---|---|---|---|---|
| Cell Measurement Result | 0..1 | | | YES ignore |
| >Cell Measurement Result Item | 1 | <maxCellingNBDU> | .. | — |
| >>Cell ID | M | | NR CGI 9.3.1.12 | — |
| >>LBT Failures detected | O | | Boolean Or ENUMERATED (false, true, ...) | — |

Alternatively, the gNB-DU may be configured to transfer, to the gNB-CU, any collected LBT failure information using a suitable information element of the DU-CU RADIO INFORMATION TRANSFER message, as shown below.

TABLE 8

| F1AP: DU-CU RADIO INFORMATION TRANSFER message | | | | | |
|---|---|---|---|---|---|
| CHOICE DU-CU Radio Information Type | M | | YES | ignore |
| >RIM | | | | | |
| >>DU-CU RIM Information | M | 9.3.1.91 | — | — |
| >LBT information | | | | | |
| >>LBT-Failures information | M | 9.3.1.xx | — | — |

TABLE 9

| LBT-Failures Information IE | | | |
|---|---|---|---|
| UL LBT-Failures Cell List | 1 | | |
| > Cell List Item | 1..<maxCellingNBDU> | | |
| >> Cell ID | M | | NR CGI 9.3.1.12 |
| >>Number of LBT Failures detected | O | | INTEGER (0..256, ...) |

Figure 17:
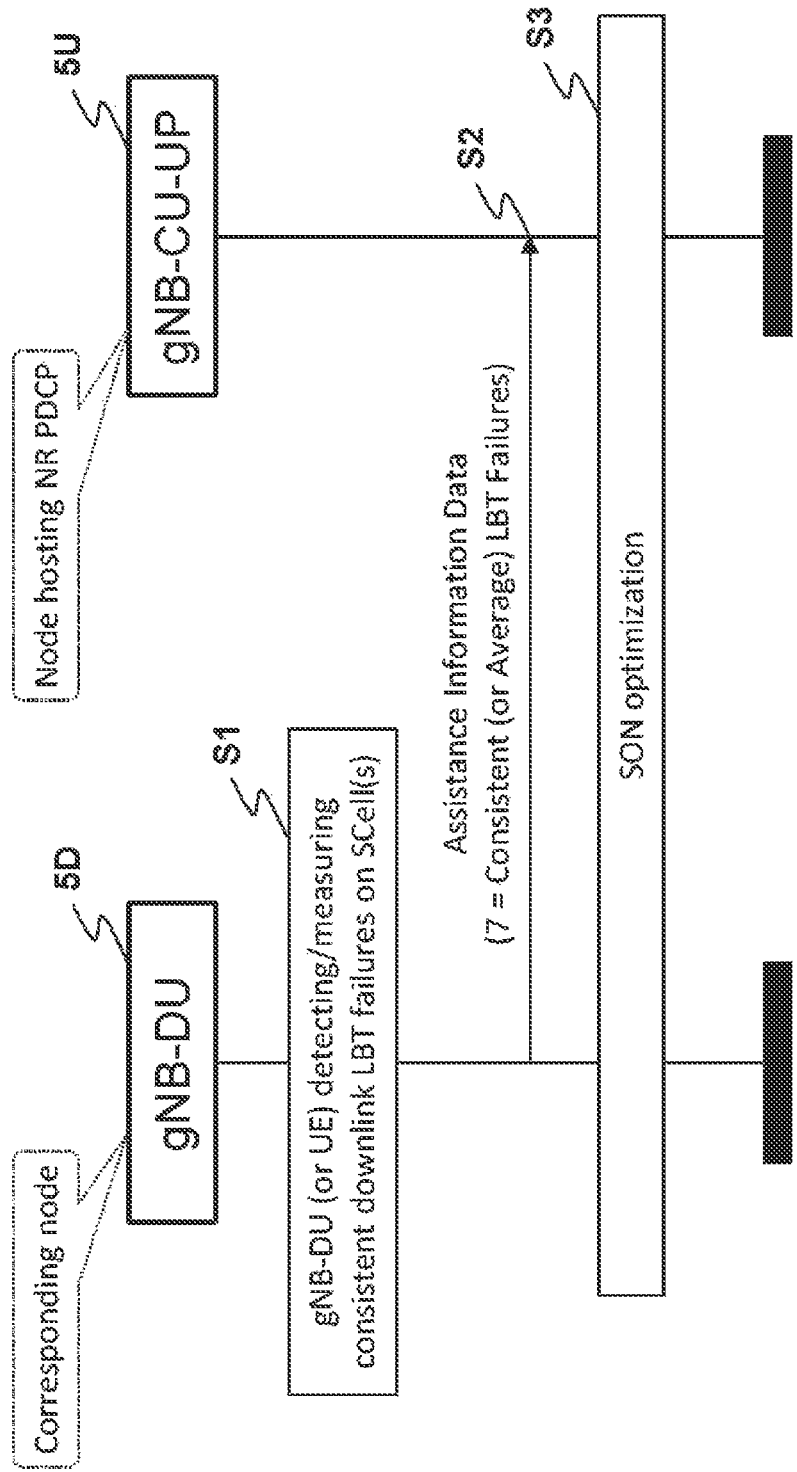
FIG. 17 is a schematic signalling (timing) diagram illustrating exemplary ways in which example embodiments of the invention can be implemented in the system of FIG. 1.

FIG. 17 is a timing diagram (message sequence chart) illustrating an exemplary method for collecting LBT failure related information for SON optimization. In this case, the gNB-CU may configure (e.g., via O&M) the gNB-DU to measure consistent (or average) LBT failures. LBT failure related information may be reported using appropriately formatted 'Assistance Information Data' frames (F1-U protocol). The Assistance Information Data frames may include a suitable cause value indicating LBT failures (e.g., on a per UE basis). For example, consistent (or average) LBT failures may be reported/indicated using a cause value (e.g., cause value=7) defined in section 5.5.3.38 of 3GPP TS 38.425, as described in the third scenario above.

MODIFICATIONS AND ALTERNATIVES

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to Internet of things' (IoT), using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g., vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 10

| Service Area | MTC applications |
| --- | --- |
| Security | Surveillance systems |
|  | Backup for landline |
|  | Control of physical access (e.g., to buildings) |
|  | Car/driver security |

TABLE 10-continued

| Service Area | MTC applications |
| --- | --- |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote Maintenance/Control | Sensors |
|  | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Applications, services, and solutions may be an Mobile Virtual Network Operator (MVNO) service, an emergency radio communication system, a Private Branch eXchange (PBX) system, a PHS/Digital Cordless Telecommunications system, a Point of sale (POS) system, an advertise calling system, a Multimedia Broadcast and Multicast Service (MBMS), a Vehicle to Everything (V2X) system, a train radio system, a location related service, a Disaster/Emergency Wireless Communication Service, a community service, a video streaming service, a femto cell application service, a Voice over LTE (VoLTE) service, a charging service, a radio on demand service, a roaming service, an activity monitoring service, a telecom carrier/communication NW selection service, a functional restriction service, a Proof of Concept (PoC) service, a personal information management service, an ad-hoc network/Delay Tolerant Networking (DTN) service, etc.

Further, the above-described UE categories are merely examples of applications of the technical ideas and exemplary embodiments described in the present document. Needless to say, these technical ideas and example embodiments are not limited to the above-described UE and various modifications can be made thereto.

The signalling message transmitted by the distributed unit may comprise at least one of: a message requesting a release of a context associated with the UE (e.g., a UE Context Release Request message); and a message requesting cell deletion and/or cell addition (e.g., a gNB-DU Configuration Update message).

The central unit may be configured as a Packet Data Convergence Protocol (PDCP) entity for the UE and the distributed node may be configured to act as a corresponding node. The base station apparatus that is configured to act as a corresponding node may comprise one of a Master Node and a Secondary Node, and the PDCP entity may be hosted by the other one of the Master Node and the Secondary Node. The signalling message transmitted by the corresponding node to the PDCP entity may comprise at least one of: a message indicating downlink delivery status (e.g., a DL Data Delivery Status message); and a message carrying assistance information (e.g., an Assistance Information Data message).

Managing said LBT communication with the UE may comprise at least one of: releasing resources reserved for the at least one cell for which said LBT failure has been detected; deactivating the at least one cell for which said LBT failure has been detected; and activating at least one new cell. The method performed by the central unit may further comprise initiating a release of resources reserved for the at least one cell for which said LBT failure has been detected by transmitting at least one of: a Bearer Context Release Request including a cause value indicating downlink LBT failures; and a UE Context Release Request including a cause value indicating uplink LBT failures. The method performed by the central unit may further comprise deactivating the at least one cell for which said LBT failure has been detected by transmitting an S-Node Release Request including a cause value indicating uplink LBT failures. The method performed by the central unit or the distributed unit may further comprise initiating a procedure for releasing a context associated with the UE in a core network by transmitting a UE Context Release Request message to a node of the core network, including information indicating that LBT failure has been detected. The method performed by the base station apparatus may comprise transmitting an S-Node Release Required message including a cause value indicating downlink LBT failures, thereby initiating said procedure for deactivating the at least one SCG cell for which said LBT failure has been detected.

The information indicating that LBT failure has been detected may comprise a cause value indicating at least one of downlink LBT failures and uplink LBT failures (e.g., Cause Value={7=LBT Failures} or Value={7=Consistent (or Average) LBT Failures}). The information indicating that LBT failure has been detected may be transmitted by the UE via a Medium Access Control (MAC) Control Element (CE) or an information element of a Radio Resource Control (RRC) message (e.g., an 'scg-LBT-failure' information element).

The method performed by the node of an access network may further comprise initiating a release of resources reserved for the at least one cell for which said LBT failure has been detected by transmitting, to a distributed unit operating said at least one cell, a UE Context Release Command including a cause value indicating uplink LBT failures. The method performed by the node of an access network may further comprise initiating deactivation of the at least one cell for which said LBT failure has been detected by transmitting, to a central unit, a UE Context Modification Required message including a cause value indicating uplink LBT failures.

The at least one cell may comprise at least one SCell. The detecting of LBT failures may comprise detecting consistent (uplink or downlink) LBT failures. The LBT failure may comprise an uplink LBT failure detected by the UE or a downlink LBT failure detected by the corresponding node (e.g., a distributed unit of the base station apparatus). The detecting of a failure associated with the LBT communication may comprise detecting a radio link failure (RLF) with respect to said at least one cell (e.g., SCell). The information indicating that LBT failure has been detected may be used for optimization of a Self-Organizing Network (SON).

Various other modifications will be apparent to those skilled in the art and will not be described in further detail here.

(Supplementary Note 1)
A method performed by a distributed unit of a base station apparatus performing Listen-Before-Talk (LBT) communication with a user equipment (UE) via at least one cell, the method comprising:
  detecting a failure associated with said LBT communication with respect to said at least one cell; and
  transmitting a signalling message to a central unit of said base station apparatus, the signalling message comprising information indicating that LBT failure has been detected, for use by said central unit in managing said LBT communication with the UE.

(Supplementary Note 2)
The method according to supplementary note 1, wherein the signalling message comprises at least one of: a message requesting a release of a context associated with the UE (e.g., a UE Context Release Request message); and a message requesting cell deletion and/or cell addition (e.g., a gNB-DU Configuration Update message).

(Supplementary Note 3)
The method according to supplementary note 1, wherein said central unit is configured as a Packet Data Convergence Protocol (PDCP) entity for the UE and said distributed node is configured to act as a corresponding node.

(Supplementary Note 4)
A method performed by a base station apparatus configured to act as a corresponding node for a Packet Data Convergence Protocol (PDCP) entity for a user equipment (UE) performing Listen-Before-Talk (LBT) communication via at least one cell, the method comprising:
  detecting a failure associated with said LBT communication with respect to said at least one cell; and
  transmitting a signalling message to the PDCP entity, the signalling message comprising information indicating that LBT failure has been detected, for use by the PDCP entity in managing said LBT communication with the UE.

(Supplementary Note 5)
The method according to supplementary note 4, wherein the base station apparatus configured to act as a corresponding node comprises one of a Master Node and a Secondary Node, and the PDCP entity is hosted by the other one of the Master Node and the Secondary Node.

(Supplementary Note 6)
The method according to supplementary note 3, 4, or 5, wherein the signalling message comprises at least one of: a message indicating downlink delivery status (e.g., a DL Data Delivery Status message); and a message carrying assistance information (e.g., an Assistance Information Data message).

(Supplementary Note 7)
A method performed by a central unit of a base station apparatus performing Listen-Before-Talk (LBT) communication with a user equipment (UE) via at least one cell, the method comprising:
  receiving, from a distributed unit operating said at least one cell, a signalling message comprising information indicating that LBT failure has been detected; and
  managing said LBT communication with the UE based on the received information.

(Supplementary Note 8)
The method according to supplementary note 7, wherein managing said LBT communication with the UE comprises at least one of: releasing resources reserved for the at least one cell for which said LBT failure has been detected;

deactivating the at least one cell for which said LBT failure has been detected; and activating at least one new cell.
(Supplementary Note 9)
The method according to supplementary note 7 or 8, further comprising initiating a release of resources reserved for the at least one cell for which said LBT failure has been detected by transmitting at least one of: a Bearer Context Release Request including a cause value indicating downlink LBT failures; and a UE Context Release Request including a cause value indicating uplink LBT failures.
(Supplementary Note 10)
The method according to supplementary note 7 or 8, further comprising deactivating the at least one cell for which said LBT failure has been detected by transmitting an S-Node Release Request including a cause value indicating uplink LBT failures.
(Supplementary Note 11)
The method according to supplementary note 1 or 7, further comprising initiating a procedure for releasing a context associated with the UE in a core network by transmitting a UE Context Release Request message to a node of the core network, including information indicating that LBT failure has been detected.
(Supplementary Note 12)
A method performed by a base station apparatus performing Listen-Before-Talk (LBT) communication with a user equipment (UE) via at least one cell of a Secondary Cell Group (SCG), the method comprising:
  detecting a failure associated with said LBT communication with respect to said at least one SCG cell; and
  transmitting a signalling message to a Master Node, the signalling message comprising information indicating that LBT failure has been detected, initiating a procedure for deactivating the at least one SCG cell for which said LBT failure has been detected.
(Supplementary Note 13)
The method according to supplementary note 12, comprising transmitting an S-Node Release Required message including a cause value indicating downlink LBT failures, thereby initiating said procedure for deactivating the at least one SCG cell for which said LBT failure has been detected.
(Supplementary Note 14)
A method performed by a base station apparatus performing Listen-Before-Talk (LBT) communication with a user equipment (UE) via at least one cell, the method comprising:
  detecting a failure associated with said LBT communication with respect to said at least one cell; and
  initiating a procedure for releasing a context associated with the UE in a core network by transmitting a UE Context Release Request message to a node of the core network, including information indicating that LBT failure has been detected.
(Supplementary Note 15)
The method according to any of supplementary notes 1 to 14, wherein said information indicating that LBT failure has been detected comprises a cause value indicating at least one of downlink LBT failures and uplink LBT failures (e.g., Cause Value={7=LBT Failures} or Value={7=Consistent (or Average) LBT Failures}).
(Supplementary Note 16)
A method performed by a user equipment (UE) performing Listen-Before-Talk (LBT) communication via at least one cell, the method comprising:
  detecting a failure associated with said LBT communication with respect to said at least one cell; and
  transmitting, to a base station apparatus, information indicating that LBT failure has been detected, for use by said base station apparatus in managing said LBT communication.
(Supplementary Note 17)
A method performed by a node of an access network communicating with a user equipment (UE) performing Listen-Before-Talk (LBT) communication via at least one cell, the method comprising:
  receiving, from the UE, information indicating that LBT failure has been detected by the UE; and
  managing said LBT communication with the UE based on the received information.
(Supplementary Note 18)
The method according to supplementary note 16 or 17, wherein the information indicating that LBT failure has been detected is transmitted via a Medium Access Control (MAC) Control Element (CE) or an information element of a Radio Resource Control (RRC) message (e.g., an 'scg-LBT-failure' information element).
(Supplementary Note 19)
The method according to supplementary note 17, further comprising initiating a release of resources reserved for the at least one cell for which said LBT failure has been detected by transmitting, to a distributed unit operating said at least one cell, a UE Context Release Command including a cause value indicating uplink LBT failures.
(Supplementary Note 20)
The method according to supplementary note 17, further comprising initiating deactivation of the at least one cell for which said LBT failure has been detected by transmitting, to a central unit, a UE Context Modification Required message including a cause value indicating uplink LBT failures.
(Supplementary Note 21)
The method according to any of supplementary notes 1 to 20, wherein said at least one cell comprises at least one SCell.
(Supplementary Note 22)
The method according to any of supplementary notes 1 to 21, wherein said detecting comprises detecting consistent LBT failures.
(Supplementary Note 23)
The method according to any of supplementary notes 1 to 22, wherein said detecting a failure associated with said LBT communication comprises detecting a radio link failure (RLF) with respect to said at least one cell.
(Supplementary Note 24)
The method according to any of supplementary notes 1 to 23, wherein said information indicating that LBT failure has been detected is used for optimization of a Self-Organizing Network (SON).
(Supplementary Note 25)
A method performed by a base station apparatus configured as a Packet Data Convergence Protocol (PDCP) entity for a user equipment (UE) performing Listen-Before-Talk (LBT) communication via at least one cell, the method comprising:
  receiving, from a base station apparatus configured to act as a corresponding node, information indicating that LBT failure has been detected with respect to said at least one cell; and
  performing a Self-Organizing Network (SON) procedure based on the received information.
(Supplementary Note 26)
The method according to supplementary note 25, wherein the LBT failure comprises an uplink LBT failure detected by the UE or comprises a downlink LBT failure detected by said corresponding node (e.g., a distributed unit of the base station apparatus).

(Supplementary Note 27)

An apparatus configured to operate as a distributed unit of a base station for performing Listen-Before-Talk (LBT) communication with a user equipment (UE) via at least one cell, the apparatus comprising:
means for detecting a failure associated with said LBT communication with respect to said at least one cell; and
means for transmitting a signalling message to a central unit of said base station apparatus, the signalling message comprising information indicating that LBT failure has been detected, for use by said central unit in managing said LBT communication with the UE.

(Supplementary Note 28)

A base station apparatus configured to act as a corresponding node for a Packet Data Convergence Protocol (PDCP) entity for a user equipment (UE) and to perform Listen-Before-Talk (LBT) communication via at least one cell, the base station apparatus comprising:
means for detecting a failure associated with said LBT communication with respect to said at least one cell; and
means for transmitting a signalling message to the PDCP entity, the signalling message comprising information indicating that LBT failure has been detected, for use by the PDCP entity in managing said LBT communication with the UE.

(Supplementary Note 29)

An apparatus configured to operate as a central unit of a base station for performing Listen-Before-Talk (LBT) communication with a user equipment (UE) via at least one cell, the apparatus comprising:
means for receiving, from a distributed unit operating said at least one cell, a signalling message comprising information indicating that LBT failure has been detected; and
means for managing said LBT communication with the UE based on the received information.

(Supplementary Note 30)

A base station apparatus for performing Listen-Before-Talk (LBT) communication with a user equipment (UE) via at least one cell of a Secondary Cell Group (SCG), the base station apparatus comprising:
means for detecting a failure associated with said LBT communication with respect to said at least one SCG cell; and
means for transmitting a signalling message to a Master Node, the signalling message comprising information indicating that LBT failure has been detected, initiating a procedure for deactivating the at least one SCG cell for which said LBT failure has been detected.

(Supplementary Note 31)

A base station apparatus for performing Listen-Before-Talk (LBT) communication with a user equipment (UE) via at least one cell, the base station apparatus comprising:
means for detecting a failure associated with said LBT communication with respect to said at least one cell; and
means for initiating a procedure for releasing a context associated with the UE in a core network by transmitting a UE Context Release Request message to a node of the core network, including information indicating that LBT failure has been detected.

(Supplementary Note 32)

A base station apparatus configured as a Packet Data Convergence Protocol (PDCP) entity for a user equipment (UE) for performing Listen-Before-Talk (LBT) communication via at least one cell, the base station apparatus comprising:
means for receiving, from a base station apparatus configured to act as a corresponding node, information indicating that LBT failure has been detected with respect to said at least one cell; and
means for performing a Self-Organizing Network (SON) procedure based on the received information.

This application is based upon and claims the benefit of priority from United Kingdom Patent Application No. 2012285.9, filed on Aug. 6, 2020, the disclosure of which is incorporated herein in its entirety by reference.

The invention claimed is:

1. A method performed by a first part of a first base station performing Listen-Before-Talk (LBT) communication with a user equipment (UE) via at least one cell, the method comprising:
detecting at least one LBT failure associated with the LBT communication with respect to the at least one cell;
transmitting, to a second part of a second base station or a node in a core network, a message including information indicating that the at least one LBT failure has been detected; and
initiating a procedure for deactivating the at least one cell for which the LBT failure has been detected by transmitting at least one of:
a message including a Bearer Context Release Request including a cause value indicating at least one downlink LBT failure; and
a message including a UE Context Release Request including a cause value indicating at least one uplink LBT failure.

2. The method according to claim 1, wherein
the transmitting is performed by transmitting to the node in the core network, and the transmitting causes the node in the core network to initiate a procedure for releasing a context associated with the UE in the core network.

3. The method according to claim 1, wherein the information indicating that the at least one LBT failure has been detected includes a cause value indicating at least one of at least one downlink LBT failure and at least one uplink LBT failure.

4. The method according to claim 1, further comprising:
performing a Self-Organizing Network (SON) procedure based on the information.

5. The method according to claim 1, wherein the message includes at least one of:
a message requesting a release of a context associated with the UE;
a message requesting cell deletion and/or cell addition;
a message indicating downlink delivery status; and
a message carrying assistance information.

6. A method performed by a second part of a second base station performing Listen-Before-Talk (LBT) communication with a user equipment (UE) via at least one cell, the method comprising:
receiving, from a first part of a first base station operating the at least one cell or a UE, a message including information indicating that at least one LBT failure has been detected; and performing at least one of:
  initiating a release of resources reserved for the at least cell for which the at least one LBT failure has been detected by receiving at least one of:
    a message including a Bearer Context Release Request including a cause value indicating at least one downlink LBT failure, and
    a message including a UE Context Release Request including a cause value indicating at least one uplink LBT failure; and
  deactivating the at least one cell for which the at least one LBT failure has been detected by receiving a Secondary access network node Release Request including a cause value indicating at least one uplink LBT failure.

7. A method performed by a user Equipment (UE) performing Listen-Before-Talk (LBT) communication via at least one cell, the method comprising:
  detecting at least one LBT failure associated with LBT communication with respect to the at least one cell; and
  transmitting, to a first base station, information indicating that the at least one LBT failure has been detected, and
  wherein a message including at least one of:
    a Bearer Context Release Request including a cause value indicating at least one downlink LBT failure,
    a UE Context Release Request including a cause value indicating at least one uplink LBT failure, and
    a Secondary access network node Release Request including a cause value indicating at least one uplink LBT failure, is transmitted for at least one of:
      initiating a release of resources reserved for the at least one cell for which the LBT failure has been detected, and
      deactivating the at least one cell for which the at least one LBT failure has been detected.

8. A first part of a first base station for performing Listen-Before-Talk (LBT) communication with a user equipment (UE) via at least one cell, the first part comprising:
  a memory storing instructions; and
  at least one processor configured to process the instructions to:
    detect at least one LBT failure associated with the LBT communication with respect to the at least one cell; and
    transmit, to a second part of a second base station, a message including information indicating that the at least one LBT failure has been detected; and
    initiate a procedure for deactivating the at least one cell for which the LBT failure has been detected by transmitting at least one of:
      a message including a Bearer Context Release Request including a cause value indicating at least one downlink LBT failure; and
      a message including a UE Context Release Request including a cause value indicating at least one uplink LBT failure.

9. A second part of a second base station for performing Listen-Before-Talk (LBT) communication with a user equipment (UE) via at least one cell, the second part comprising:
  a memory storing instructions; and
  at least one processor configured to process the instructions to:
    receive, from a first part of a first base station operating the at least one cell, a message including information indicating that at least one LBT failure has been detected; and
    perform at least one of:
      initiating a release of resources reserved for the at least one cell for which the LBT failure has been detected by receiving at least one of:
        a message including a Bearer Context Release Request including a cause value indicating at least one downlink LBT failure; and
        a message including a UE Context Release Request including a cause value indicating at least one uplink LBT failure, and
      deactivating the at least one cell for which the at least one LBT failure has been detected by receiving a Secondary access network node Release Request including a cause value indicating at least one uplink LBT failure.

10. A user equipment (UE) performing Listen-Before-Talk (LBT) communication via at least one cell, the UE comprising:
  a memory storing instructions; and
  at least one processor configured to process the instructions to:
    detect at least one LBT failure associated with the LBT communication with respect to the at least one cell; and
    transmit, to a first base station, information indicating that the at least one LBT failure has been detected;
  wherein a message including at least one of
    a Bearer Context Release Request including a cause value indicating at least one downlink LBT failure,
    a UE Context Release Request including a cause value indicating at least one uplink LBT failure, and
    a Secondary access network node Release Request including a cause value indicating at least one uplink LBT failure, is transmitted for at least one of:
      initiating a release of resources reserved for the at least one cell for which the LBT failure has been detected, and
      deactivating the at least one cell for which the at least one LBT failure has been detected.

* * * * *